(12) United States Patent
Wang et al.

(10) Patent No.: US 12,498,546 B2
(45) Date of Patent: Dec. 16, 2025

(54) OPTICAL LENS ASSEMBLY AND PHOTOGRAPHING MODULE

(71) Applicants: DONGGUAN NEOPTIC CO., LTD., Guangdong Province (CN); NEWMAX TECHNOLOGY CO., LTD., Taichung (TW)

(72) Inventors: Jian Wang, Guangdong Province (CN); Jun Wang, Guangdong Province (CN); Kuo-Chun Hsiao, Taichung (TW)

( * ) Notice: Subject to any disclaimer, the term of this patent is extended or adjusted under 35 U.S.C. 154(b) by 423 days.

(21) Appl. No.: 18/126,377

(22) Filed: Mar. 24, 2023

(65) Prior Publication Data

US 2024/0255738 A1 Aug. 1, 2024

(30) Foreign Application Priority Data

Jan. 31, 2023 (CN) .......................... 202310046427.4

(51) Int. Cl.
*G02B 13/00* (2006.01)
*G02B 9/56* (2006.01)
*G03B 17/17* (2021.01)

(52) U.S. Cl.
CPC ............ *G02B 13/0065* (2013.01); *G02B 9/56* (2013.01); *G02B 13/004* (2013.01); *G03B 17/17* (2013.01)

(58) Field of Classification Search
CPC ..... G02B 13/0065; G02B 9/56; G02B 13/004
See application file for complete search history.

(56) References Cited

FOREIGN PATENT DOCUMENTS

| JP | 2000133588 A | * | 5/2000 | |
|---|---|---|---|---|
| KR | 20230169810 A | * | 12/2023 | ......... G02B 13/0045 |

* cited by examiner

*Primary Examiner* — Lucy P Chien
(74) *Attorney, Agent, or Firm* — Bruce Stone LLP; Joseph A. Bruce

(57) ABSTRACT

An optical lens assembly with a first optical axis and a second optical axis parallel to the first optical axis, includes a first element group located on an object side of the optical lens assembly; a second element group located on an image side of the optical lens assembly; and a light guide element disposed at the position where the first and second optical axes pass. The first and second element groups being located on the same side of the light guide element. The optical lens assembly has a long focal length, a compact size and a relatively higher illumination when satisfying a specific condition.

20 Claims, 13 Drawing Sheets

OPTICAL LENS ASSEMBLY AND PHOTOGRAPHING MODULE

BACKGROUND

Field of the Invention

The present invention relates to an optical lens assembly and a photographing module, and more particularly to an optical lens assembly and a photographing module applicable to electronic products.

Description of Related Art

Miniaturized photographing modules with high image resolution have been the standard equipment for various mobile devices, and a smaller pixel size of image sensor could be made due to the advanced technologies of semiconductor process, there's an increasing demand for photographing modules to feature finer image resolution and better image quality. However, conventional photographing modules used in mobile devices, such as, mobile phones or tablet computers, and in other wearable electronic devices, in addition to the requirements for the performance thereof, such as high image quality and resolution, are required to have an optical zoom function, so the photographing modules have gradually attracted the attention of consumers. Understandably, when the zoom magnification increases, the total length of the photographing module increases, so mobile electronic products become more cumbersome. Therefore, how to develop a miniaturized photographing module having a long focal length is the technical bottleneck to overcome at present.

The present invention mitigates and/or obviates the aforementioned disadvantages.

SUMMARY

The objective of the present invention is to provide an optical lens assembly and a photographing module, and the optical lens assembly includes a first element group, a second element group and a light guide element. When a specific condition is satisfied, the optical lens assembly can achieve a long focal length and the miniaturization of the photographing module and provide a relatively higher illumination.

In addition, when one of lenses of the first element group is made of glass, the optical lens assembly of the present invention can be used at more extreme temperatures, so as to reduce the influence of ambient temperature on the image quality.

Therefore, an optical lens assembly with a first optical axis and a second optical axis parallel to the first optical axis in accordance with the present invention includes: a first element group located on an object side of the optical lens assembly; a second element group located on an image side of the optical lens assembly; and a light guide element passed through by the first and second optical axes, and the first and second element groups located on the same side of the light guide element. The first element group is disposed along the first optical axis and includes, in order from the object side to the image side: a first lens with positive refractive power, a second lens with refractive power, a third lens with refractive power, and a fourth lens with positive refractive; the second element group is disposed along the second optical axis and includes an optical filter; the light guide element allows light to transmit from the first element group along the first optical axis to the second element group along the second optical axis via; and a distance from an object-side surface of the first lens to an image-side surface of the fourth lens along the first optical axis is CTL, a maximum image height of the optical lens assembly is IMH, a focal length of the optical lens assembly is f, a focal length of the first lens is f1, and the following conditions are satisfied: $0.65 < CTL/IMH < 1.61$ and $-0.9 < f1/f < 0$.

The present invention has the following effect. When $0.65 < CTL/IMH < 1.61$ is satisfied, the overall size of the optical lens assembly can be effectively reduced, so that the photographing module can better meet the dimensional requirements. When $-0.9 < f1/f < 0$ is satisfied, the deflection angle of the light can be reduced, so as to enhance the image quality of the optical lens assembly.

Optionally, the optical lens assembly has a total of four lenses with refractive power.

Optionally, when the first lens of the optical lens assembly is made of glass, the optical lens assembly can be used at more extreme temperatures.

Optionally, the focal length of the optical lens assembly is f, an entrance pupil diameter of the optical lens assembly is EPD, and the following condition is satisfied: $1.74 < |f/EPD| < 4.14$, which can effectively increase the luminous flux of the lens device and enhance the image quality of the lens device in the dark environment.

Optionally, an optical distortion of the optical lens assembly is ODT, and the following condition is satisfied: $|ODT| < 1\%$, which is favorable to reducing the deformation of imaging of an object by controlling the optical distortion of the optical lens assembly.

Optionally, a focal length of the third lens is f3, the focal length of the optical lens assembly is f, and the following condition is satisfied: $-2.85 < f3/f < 1.06$, which is conducive to restricting the on-axis spherical aberration of the optical lens assembly to a reasonable range to ensure the image quality of the on-axis field of view.

Optionally, a radius of curvature of an object-side surface of the fourth lens is R7, a radius of curvature of the image-side surface of the fourth lens is R8, and the following condition is satisfied: $-18.46 < (R7-R8)/(R7+R8) < 5.33$, which is conducive to reducing the comatic aberration in the on-axis and off-axis fields of view to ensure that the optical lens assembly has a better image quality.

Optionally, the focal length of the first lens is f1, a focal length of the fourth lens is f4, the focal length of the optical lens assembly is f, and the following condition is satisfied: $-1.84 < (f1+f4)/f < -0.91$, which is conducive to ensuring a good imaging quality in the on-axis field of view.

Optionally, a thickness of the third lens at a maximum effective diameter position of the third lens is ET3, a thickness of the fourth lens at a maximum effective diameter position of the fourth lens is ET4, and the following condition is satisfied: $0.8 < ET3/ET4 < 4.18$, which is conducive to making the injection molding of lenses easy to enhance the formability of the lenses.

Optionally, the radius of curvature of an object-side surface of the fourth lens is R7, the radius of curvature of the image-side surface of the fourth lens is R8, a radius of curvature of an object-side surface of the third lens is R5, and the following condition is satisfied: $-13.41 < (R7+R8)/R5 < -0.25$, which is conducive to matching up the optical lens assembly and the angle of the chief ray to an image sensor.

Optionally, a total of gaps between every two adjacent lenses of the first element group in the first optical axis is $\Sigma AT$, and the following condition is satisfied: 0.71 mm<ΣAT<1.98 mm, which is conducive to avoiding the over-deflection of light and reducing the difficulty of processing and assembly of lenses.

Optionally, a thickness of the fourth lens along the first optical axis is CT4, a thickness of the third lens along the first optical axis is CT3, and the following condition is satisfied: 0.78<CT4/CT3<2.72, which is conducive to reducing the thickness sensitivity of the lenses and correcting the curvature of field.

Optionally, a radius of curvature of an image-side surface of the first lens is R2, a radius of curvature of an object-side surface of the second lens is R3, and the following condition is satisfied: −4.61<R2/R3<4.62, which is conducive to eliminating the spherical aberration of the optical lens assembly effectively to obtain a high-resolution image.

Optionally, a focal length of the second lens is f2, a radius of curvature of an image-side surface of the second lens is R4, and the following condition is satisfied: −13.07<f2/R4<−0.35, which is conducive to making the contribution of curvature of field of the image-side surface of the second lens be in a reasonable range.

Optionally, the number of light reflections in the light guide element is NRP, and the following condition is satisfied: NRP≥3, which is conducive to ensuring a better image quality and reducing the thickness of the light guide element (for example, but not limited to, a prism) in the optical axis.

Optionally, a base angle of the light guide element is ABP, and the following condition is satisfied: 15 degrees<ABP<40 degrees, which is conducive to ensuring that light can be reflected three times in the light guide element (for example, but not limited to, a prism).

Moreover, a photographing module in accordance with the present invention includes a lens barrel, an optical lens assembly disposed in the lens barrel, and an image sensor disposed on an image plane of the optical lens assembly. The optical lens assembly with a first optical axis and a second optical axis parallel to the first optical axis, includes a first element group located on an object side of the optical lens assembly; a second element group located on an image side of the optical lens assembly; and a light guide element passed through by the first and second optical axes, and the first and second element groups located on the same side of the light guide element. The first element group is disposed along the first optical axis and includes, in order from the object side to the image side: a first lens with positive refractive power, a second lens with refractive power, a third lens with refractive power, and a fourth lens with positive refractive. The second element group is disposed along the second optical axis and includes an optical filter. The optical lens assembly allows light to transmit from the first element group along the first optical axis to the second element group along the second optical axis via the light guide element. A distance from an object-side surface of the first lens to an image-side surface of the fourth lens along the first optical axis is CTL, a maximum image height of the optical lens assembly is IMH, a focal length of the optical lens assembly is f, a focal length of the first lens is f1, and the following conditions are satisfied: 0.65<CTL/IMH<1.61 and −0.9<f1/f<0.

The present invention has the following effect. When 0.65<CTL/IMH<1.61 is satisfied, the overall size of the optical lens assembly can be effectively reduced, so that the photographing module can better meet the dimensional requirements. When −0.9<f1/f<0 is satisfied, the deflection angle of the light can be reduced, so as to enhance the image quality of the optical lens assembly.

Optionally, the optical lens assembly has a total of four lenses with refractive power.

Optionally, when the first lens of the optical lens assembly is made of glass, the optical lens assembly can be used at more extreme temperatures.

Optionally, the focal length of the optical lens assembly is f, an entrance pupil diameter of the optical lens assembly is EPD, and the following condition is satisfied: 1.74<|f/EPD|<4.14, which can effectively increase the lens luminous flux of the lens device and enhance the image quality of the lens device in the dark environment.

Optionally, an optical distortion of the optical lens assembly is ODT, and the following condition is satisfied: |ODT|<1%, which is favorable to reducing the deformation of imaging of an object by controlling the optical distortion of the optical lens assembly.

Optionally, a focal length of the third lens is f3, the focal length of the optical lens assembly is f, and the following condition is satisfied: −2.85<f3/f<1.06, which is conducive to restricting the on-axis spherical aberration of the optical lens assembly to a reasonable range to ensure the image quality of the on-axis field of view.

Optionally, a radius of curvature of an object-side surface of the fourth lens is R7, a radius of curvature of the image-side surface of the fourth lens is R8, and the following condition is satisfied: −18.46<(R7−R8)/(R7+R8)<5.33, which is conducive to reducing the comatic aberration in the on-axis and off-axis fields of view to ensure that the optical lens assembly has a better image quality.

Optionally, the focal length of the first lens is f1, a focal length of the fourth lens is f4, the focal length of the optical lens assembly is f, and the following condition is satisfied: −1.84<(f1+f4)/f<−0.91, which is conducive to ensuring a good imaging quality in the on-axis field of view.

Optionally, a thickness of the third lens at a maximum effective diameter position of the third lens is ET3, a thickness of the fourth lens at a maximum effective diameter position of the fourth lens is ET4, and the following condition is satisfied: 0.8<ET3/ET4<4.18, which is conducive to making the injection molding of lenses easy to enhance the formability of the lenses.

Optionally, the radius of curvature of an object-side surface of the fourth lens is R7, the radius of curvature of the image-side surface of the fourth lens is R8, a radius of curvature of an object-side surface of the third lens is R5, and the following condition is satisfied: −13.41<(R7+R8)/R5<−0.25, which is conducive to matching up the optical lens assembly and the angle of the chief ray to an image sensor.

Optionally, a total of gaps between every two adjacent lenses of the first element group in the first optical axis is ΣAT, and the following condition is satisfied: 0.71 mm<ΣAT<1.98 mm, which is conducive to avoiding the over-deflection of light and reducing the difficulty of processing and assembly of lenses.

Optionally, a thickness of the fourth lens along the first optical axis is CT4, a thickness of the third lens along the first optical axis is CT3, and the following condition is satisfied: 0.78<CT4/CT3<2.72, which is conducive to reducing the thickness sensitivity of the lenses and correcting the curvature of field.

Optionally, a radius of curvature of an image-side surface of the first lens is R2, a radius of curvature of an object-side surface of the second lens is R3, and the following condition is satisfied: −4.61<R2/R3<4.62, which is conducive to eliminating the spherical aberration of the optical lens assembly effectively to obtain a high-resolution image.

Optionally, a focal length of the second lens is f2, a radius of curvature of an image-side surface of the second lens is R4, and the following condition is satisfied: $-13.07 < f2/R4 < -0.35$, which is conducive to making the contribution of curvature of field of the image-side surface of the second lens be in a reasonable range.

Optionally, the number of light reflections in the light guide element is NRP, and the following condition is satisfied: $NRP \geq 3$, which is conducive to ensuring a better image quality and reducing the thickness of the light guide element (for example, but not limited to, a prism) in the optical axis.

Optionally, a base angle of the light guide element is ABP, and the following condition is satisfied: 15 degrees<ABP<40 degrees, which is conducive to ensuring that light can be reflected three times in the light guide element (for example, but not limited to, a prism).

Also, another optical lens assembly with a first optical axis and a second optical axis parallel to the first optical axis in accordance with the present invention, includes: a first element group located on an object side of the optical lens assembly; a second element group located on an image side of the optical lens assembly; and a light guide element passed through by the first and second optical axes pass, and the first and second element groups located on the same side of the light guide element. The first element group is disposed along the first optical axis and includes, in order from the object side to the image side: a first lens with positive refractive power, and an image-side surface of the first lens being convex in a paraxial region thereof in the first optical axis; a second lens with refractive power; a third lens with refractive power; and a fourth lens with positive refractive, an object-side surface of the fourth lens being convex in a paraxial region thereof in the first optical axis, and an image-side surface of the fourth lens being convex in a paraxial region thereof in the first optical axis. The second element group is disposed along the second optical axis and includes an optical filter. The optical lens assembly allows light to transmit from the first element group along the first optical axis to the second element group along the second optical axis via the light guide element. A half of a maximum field of view of the optical lens assembly is HFOV, an entrance pupil diameter of the optical lens assembly is EPD, a distance from an object-side surface of the first lens to the image-side surface of the fourth lens along the first optical axis is CTL, a focal length of the optical lens assembly is f, a focal length of the first lens is f1, and the following conditions are satisfied: 9.61 degrees<HFOV*EPD/CTL<33.64 degrees and $-0.9 < f1/f < 0$.

The present invention has the following effect. When 9.61 degrees<HFOV*EPD/CTL<33.64 degrees is satisfied, the optical lens assembly can have a better ratio of the space, the field of view and the entrance pupil diameter to provide a long focal length and a large aperture. When $-0.9 < f1/f < 0$ is satisfied, the deflection angle of the light can be reduced, so as to enhance the image quality of the optical lens assembly.

Optionally, the optical lens assembly has a total of four lenses with refractive power.

When the first lens is made of glass, the optical lens assembly can be used at more extreme temperatures.

Optionally, the focal length of the optical lens assembly is f, a focal length of the fourth lens is f4, and the following condition is satisfied: $-1.61 < f/f4 < -0.71$, which is conducive to reducing the high-order aberration by the ratio of the focal length of the fourth lens to that of the optical lens assembly, so as to enhance the image quality.

Optionally, a focal length of the second lens is f2, a focal length of the third lens is f3, and the following condition is satisfied: $-2.07 < f2/f3 < 2.58$, which is conducive to achieving the more appropriate distribution of the refractive power of the optical lens assembly, thereby maintaining a wide field of view and enhancing the relative illuminance of the optical lens assembly.

Optionally, the focal length of the third lens is f3, the focal length of the fourth lens is f4, and the following condition is satisfied: $-1.26 < f3/f4 < 3.53$, which is conducive to achieving more appropriate distribution of refractive power of the optical lens assembly to correct the system aberration, thereby enhancing the image quality.

Optionally, the focal length of the first lens is f1, the focal length of the second lens is f2, the focal length of the third lens is f3, and the following condition is satisfied: $-25.09 < f1*f2/f3 < 32.04$, which is conducive to enlarging the field of view of the lens device and providing enough amount of incident light.

Optionally, a thickness of the first lens along the optical axis is CT1, a thickness of the second lens along the optical axis is CT2, a thickness of the third lens along the optical axis is CT3, and the following condition is satisfied: $2.57 < (CT1+CT2)/CT3 < 4.85$, which is conducive to achieve the more appropriate ratio of the thicknesses of the lenses, thereby enhancing the lens formability.

Optionally, an Abbe number of the first lens is vd1, an Abbe number of the second lens is vd2, and the following condition is satisfied: $2.31 < vd1-vd2 < 20.40$, which is conducive to correcting the aberration of the optical lens assembly and enhancing the image quality by the arrangement of the lenses.

Optionally, the focal length of the optical lens assembly is f, a radius of curvature of the object-side surface of the first lens is R1, a radius of curvature of the image-side surface of the first lens is R2, and the following condition is satisfied: $-54.49 < f*(R1/R2) < 26.12$, which is conducive to achieve a better ratio of the radii of curvature of the first lens to enhance the formability of the first lens of glass material.

Optionally, the focal length of the first lens is f1, the focal length of the fourth lens is f4, the thickness of the first lens along the optical axis is CT1, a thickness of the fourth lens along the optical axis is CT4, and the following condition is satisfied: $37.33 \text{ mm} < f1*f4/(CT1+CT4) < 112.89 \text{ mm}$, which is conducive to achieving the better thicknesses and refractive power of the first and fourth lenses to enhance the image quality of the optical lens assembly and reduce the lens tolerance.

Optionally, a radius of curvature of the object-side surface of the fourth lens is R7, a radius of curvature of the image-side surface of the fourth lens is R8, and the following condition is satisfied: $-5.22 < R7/R8 < -0.70$, which is conducive to achieving a better ratio of the radii of curvature of the fourth lens to reduce the aberration of the optical lens assembly.

Optionally, the focal length of the third lens is f3, the focal length of the fourth lens is f4, the thickness of the third lens along the optical axis is CT3, the thickness of the fourth lens along the optical axis is CT4, and the following condition is satisfied: $-0.81 < f3*CT3/(f4*CT4) < 3.61$, which is conducive to achieving the better thicknesses and refractive power of the third and fourth lenses to enhance the image quality of the optical lens assembly and reduce the lens tolerance.

In addition, another photographing module in accordance with the present invention includes a lens barrel, an optical lens assembly disposed in the lens barrel, and an image sensor disposed on an image plane of the optical lens assembly. The optical lens assembly with a first optical axis and a second optical axis parallel to the first optical axis, includes a first element group located on an object side of the optical lens assembly; a second element group located on an image side of the optical lens assembly; and a light guide element passed through by the first and second optical axes, and the first and second element groups being located on the same side of the light guide element. The first element group is disposed along the first optical axis and includes, in order from the object side to the image side: a first lens with positive refractive power, and an image-side surface of the first lens being convex in a paraxial region thereof in the first optical axis; a second lens with refractive power; a third lens with refractive power; and a fourth lens with positive refractive, an object-side surface of the fourth lens being convex in a paraxial region thereof in the first optical axis, and an image-side surface of the fourth lens being convex in a paraxial region thereof in the first optical axis. The second element group is disposed along the second optical axis and includes an optical filter. The optical lens assembly allows light to transmit from the first element group along the first optical axis to the second element group along the second optical axis via the light guide element. A half of a maximum field of view of the optical lens assembly is HFOV, an entrance pupil diameter of the optical lens assembly is EPD, a distance from an object-side surface of the first lens to the image-side surface of the fourth lens along the first optical axis is CTL, a focal length of the optical lens assembly is f, a focal length of the first lens is f1, and the following conditions are satisfied: 9.61 degrees<HFOV*EPD/CTL<33.64 degrees and −0.9<f1/f<0.

The present invention has the following effect. When 9.61 degrees<HFOV*EPD/CTL<33.64 degrees is satisfied, the optical lens assembly can have a better ratio of the space, the field of view and the entrance pupil diameter to provide a long focal length and a large aperture. When −0.9<f1/f<0 is satisfied, the deflection angle of the light can be reduced, so as to enhance the image quality of the optical lens assembly.

Optionally, the optical lens assembly has a total of four lenses with refractive power.

When the first lens is made of glass, the optical lens assembly can be used at more extreme temperatures.

Optionally, the focal length of the optical lens assembly is f, a focal length of the fourth lens is f4, and the following condition is satisfied: −1.61<f/f4<−0.71, which is conducive to reducing the high-order aberration by the ratio of the focal length of the fourth lens to that of the optical lens assembly, so as to enhance the image quality.

Optionally, a focal length of the second lens is f2, a focal length of the third lens is f3, and the following condition is satisfied: −2.07<f2/f3<2.58, so that the distribution of the refractive power of the optical lens assembly is appropriate, which is favorable to maintaining a wide field of view and enhancing the relative illuminance of the optical lens assembly.

Optionally, the focal length of the third lens is f3, the focal length of the fourth lens is f4, and the following condition is satisfied: −1.26<f3/f4<3.53, which is conducive to achieving more appropriate distribution of refractive power of the optical lens assembly to correct the system aberration, thereby enhancing the image quality.

Optionally, the focal length of the first lens is f1, the focal length of the second lens is f2, the focal length of the third lens is f3, and the following condition is satisfied: −25.09<f1*f2/f3<32.04, which is conducive to enlarging the field of view of the lens device and providing enough amount of incident light.

Optionally, a thickness of the first lens along the optical axis is CT1, a thickness of the second lens along the optical axis is CT2, a thickness of the third lens along the optical axis is CT3, and the following condition is satisfied: 2.57<(CT1+CT2)/CT3<4.85, which is conducive to achieve the more appropriate ratio of the thicknesses of the lenses, thereby enhancing the lens formability.

Optionally, an Abbe number of the first lens is vd1, an Abbe number of the second lens is vd2, and the following condition is satisfied: 2.31<vd1-vd2<20.40, which is conducive to correcting the aberration of the optical lens assembly and enhancing the image quality by the arrangement of the lenses.

Optionally, the focal length of the optical lens assembly is f, a radius of curvature of the object-side surface of the first lens is R1, a radius of curvature of the image-side surface of the first lens is R2, and the following condition is satisfied: −54.49<f*(R1/R2)<26.12, which is conducive to achieve a better ratio of the radii of curvature of the first lens to enhance the formability of the first lens of glass material.

Optionally, the focal length of the first lens is f1, the focal length of the fourth lens is f4, the thickness of the first lens along the optical axis is CT1, a thickness of the fourth lens along the optical axis is CT4, and the following condition is satisfied: 37.33 mm<f1*f4/(CT1+CT4)<112.89 mm, which is conducive to achieving the better thicknesses and refractive power of the first and fourth lenses to enhance the image quality of the optical lens assembly and reduce the lens tolerance.

Optionally, a radius of curvature of the object-side surface of the fourth lens is R7, a radius of curvature of the image-side surface of the fourth lens is R8, and the following condition is satisfied: −5.22<R7/R8<−0.70, which is conducive to achieving a better ratio of the radii of curvature of the fourth lens to reduce the aberration of the optical lens assembly.

Optionally, the focal length of the third lens is f3, the focal length of the fourth lens is f4, the thickness of the third lens along the optical axis is CT3, the thickness of the fourth lens along the optical axis is CT4, and the following condition is satisfied: −0.81<f3*CT3/(f4*CT4)<3.61, which is conducive to achieving the better thicknesses and refractive power of the third and fourth lenses to enhance the image quality of the optical lens assembly and reduce the lens tolerance.

The present invention will be presented in further details from the following descriptions with the accompanying drawings, which show, for purpose of illustrations only, the preferred embodiments in accordance with the present invention.

DETAILED DESCRIPTION

First Embodiment

Figure 1A:
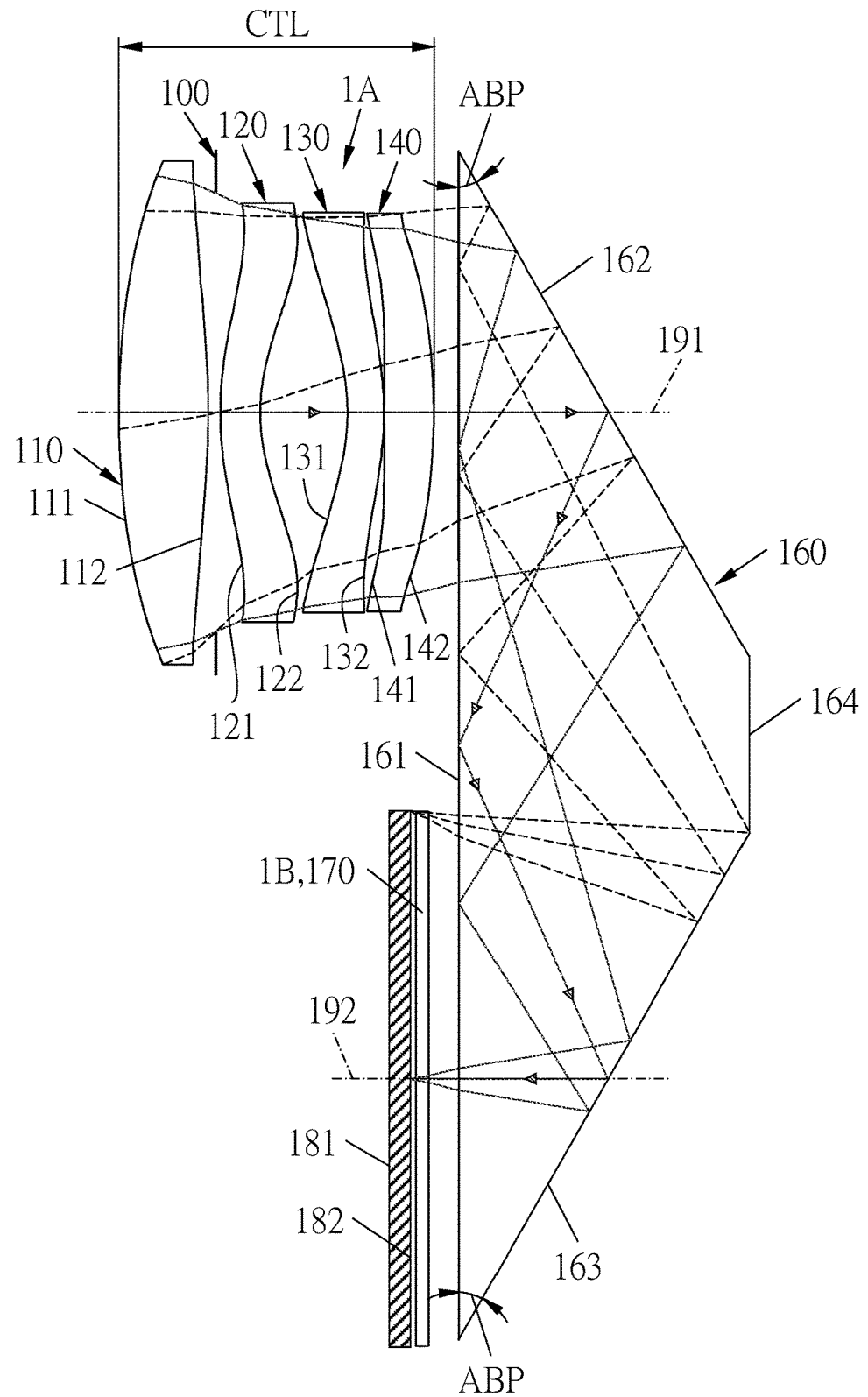
FIG. 1A is a schematic view of an optical lens assembly in accordance with a first embodiment of the present invention.
Figure 1B:
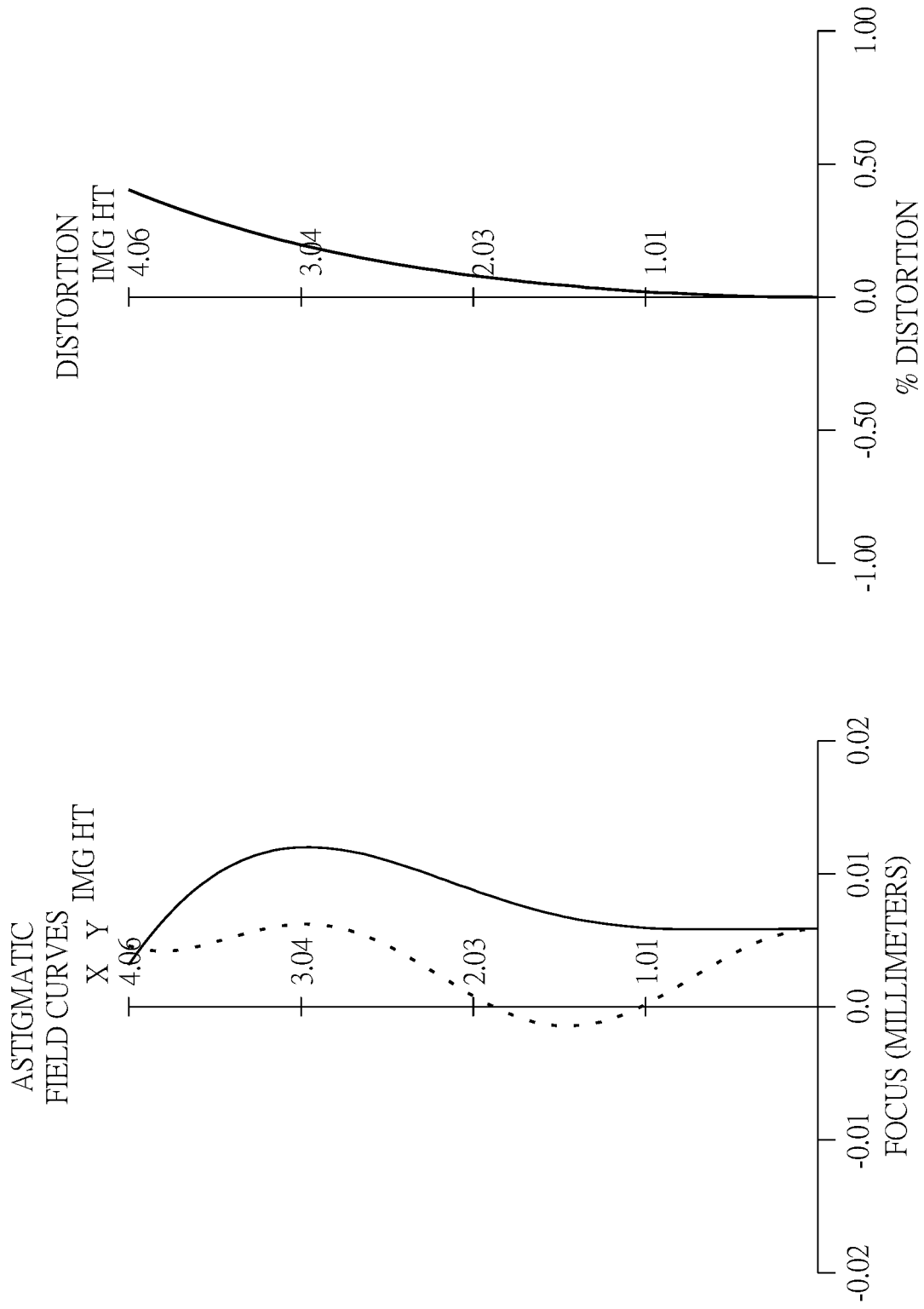
FIG. 1B is a schematic diagram showing, in order from left to right, the field curvature curve and the distortion curve of the first embodiment of the present invention.

Referring to FIGS. 1A and 1B, FIG. 1A shows a schematic view of an optical lens assembly in accordance with a first embodiment of the present invention, and FIG. 1B shows, in order from left to right, the field curvature curve and the distortion curve of the first embodiment of the present invention. As shown in FIG. 1A, the optical lens assembly is applicable to be disposed in a first optical axis 191 and a second optical axis 192 parallel to the first optical axis 191, and includes: a first element group 1A located on an object side of the optical lens assembly; a second element group 1B located on an image side of the optical lens assembly; and a light guide element 160 disposed at the position where the first optical axis 191 and the second optical axis 192 pass, the first element group 1A and the second element group 1B being located on the same side of the light guide element 160, and the light guide element 160 being configured to let light rays entering along the first optical axis 191, output toward the second element group 1B along the second optical axis 192. The optical lens assembly can cooperate with an image sensor 181 disposed on an image plane 182. The optical lens assembly has a total of four lenses with refractive power, but not limited thereto.

The first element group 1A is disposed along the first optical axis 191 and includes, in order from the object side to the image side: a first lens 110, an stop 100, a second lens 120, a third lens with 130, and a fourth lens 140.

The first lens 110 with positive refractive power includes an object-side surface 111 and an image-side surface 112, the object-side surface 111 of the first lens 110 is convex in a paraxial region thereof in the first optical axis 191, the image-side surface 112 (that is, the surface opposite to the object-side surface 111 and facing the light guide element 160) of the first lens 110 is convex in a paraxial region thereof in the first optical axis 191, the object-side surface 111 and the image-side surface 112 of the first lens 110 are aspheric, and the first lens 110 is made of glass.

The second lens 120 with negative refractive power includes an object-side surface 121 and an image-side surface 122, the object-side surface 121 of the second lens 120 is convex in a paraxial region thereof in the first optical axis 191, the image-side surface 122 (that is, the surface opposite to the object-side surface 121 and facing the light guide element 160) of the second lens 120 is concave in a paraxial region thereof in the first optical axis 191, the object-side surface 121 and the image-side surface 122 of the second lens 120 are aspheric, and the second lens 120 is made of plastic.

The third lens 130 with negative refractive power includes an object-side surface 131 and an image-side surface 132, the object-side surface 131 of the third lens 130 is concave in a paraxial region thereof in the first optical axis 191, the image-side surface 132 (that is, the surface opposite to the object-side surface 131 and facing the light guide element 160) of the third lens 130 is convex in a paraxial region thereof in the first optical axis 191, the object-side surface 131 and the image-side surface 132 of the third lens 130 are aspheric, and the third lens 130 is made of plastic.

The fourth lens 140 with positive refractive power includes an object-side surface 141 and an image-side surface 142, the object-side surface 141 of the fourth lens 140 is convex in a paraxial region thereof in the first optical axis 191, the image-side surface 142 (that is, the surface opposite to the object-side surface 141 and facing the light guide element 160) of the fourth lens 140 is convex in a paraxial region thereof in the first optical axis 191, the object-side surface 141 and the image-side surface 142 of the fourth lens 140 are aspheric, and the fourth lens 140 is made of plastic.

The second element group 1B is disposed along the second optical axis 192 and includes an optical filter 170. The optical filter 170 is made of glass, is located between the light guide element 160 and the image plane 182, and does not interfere with the focal length of the optical lens assembly. In the present embodiment, the optical filter 170 is selected from, for example, but not limited to, optical filters that allow light in the visible light waveband, in the infrared light waveband or in both the visible and infrared light wavebands to pass therethrough.

The light guide element 160 is a prism and is trapezoidal in cross section, but is not limited thereto. The light guide element 160 includes a first light guide surface 161, a second light guide surface 162, a third light guide surface 163 and a connecting surface 164. The light guide element 160 is disposed at the position where the first optical axis 191 and the second optical axis 192 pass, and is located on the same side of the first element group 1A and the second element group 1B. The first light guide surface 161 is substantially vertical to the first optical axis 191 and the second optical axis 192 and is located on the same side as the second optical axis 192. The second light guide surface 162 is connected to one side of the first light guide surface 161 and is located in the first optical axis 191, and the second light guide surface 162 and the first light guide surface 161 together form a base angle (ABP) of the light guide element 160. The third light guide surface 163 is connected to the opposite side of the first light guide surface 161 and is located in the second optical axis 192, and the third light guide surface 163 and the first light guide surface 161 together form another base angle (ABP) of the light guide element 160. The connecting surface 164 is connected to and located between the second light guide surface 162 and the third light guide surface 163. The light guide element 160 is configured to let light rays entering along the first optical axis 191, output toward the second element group 1B along the second optical axis 192. As shown in FIG. 1A, the solid line marked by arrows indicates the path of the chief ray in the first element group 1A in the first optical axis 191 and in the second element group 1B in the second optical axis 192. After the chief ray passes through the first element group 1A and enters the light guide element 160 along the first optical axis 191, the chief ray is reflected by the second light guide surface 162 to the first light guide surface 161 for the first light reflection. Then, the chief ray is reflected by the first light guide surface 161 to the third light guide surface 163 for the second light reflection. Finally, the chief ray is reflected by the third light guide surface 163 for the third light reflection, and the chief ray reflected by the third light guide surface 163 emits toward the second element group 1B along the second optical axis 192.

The curve equation for the aspheric surface profiles of the respective lenses of the first embodiment is expressed as follows:

$$z(h) = \frac{ch^2}{1 + [1-(k+1)c^2h^2]^{0.5}} + \sum (A_i) \cdot (h^i)$$

wherein:
z represents the value of a reference position at a height of h with respect to a vertex of the surface of a lens along the first optical axis 191;
c represents a paraxial curvature (i.e., a curvature of a lens surface in a paraxial region thereof) equal to 1/R (R: a paraxial radius of curvature);
h represents a vertical distance from the point on the curve of the aspheric surface to the first optical axis 191;
k represents the conic constant; and
Ai represents the i-th order aspheric coefficient.

In the first embodiment of the optical lens assembly, a focal length of the optical lens assembly is f, a f-number of the optical lens assembly is Fno, a maximum field of view of the optical lens assembly is FOV, an entrance pupil diameter of the optical lens assembly is EPD, and their values are expressed as follows: f=−16.00 mm; Fno=2.23; FOV=28.35 degrees; and EPD=7.17 mm.

In the first embodiment of the optical lens assembly, the focal length of the optical lens assembly is f, the entrance pupil diameter of the optical lens assembly is EPD, a focal length of the first lens 110 is f1, and the following conditions are satisfied: |f/EPD|=2.23 and f1/f=−0.45.

In the first embodiment of the optical lens assembly, a distance from the object-side surface 111 of the first lens 110 to the image-side surface 142 of the fourth lens 140 along the first optical axis 191 is CTL, a maximum image height of the optical lens assembly is IMH, and the following condition is satisfied: CTL/IMH=1.28.

In the first embodiment of the optical lens assembly, an optical distortion of the optical lens assembly is ODT, and the following condition is satisfied: |ODT|=0.4%.

In the first embodiment of the optical lens assembly, a focal length of the third lens 130 is f3, the focal length of the optical lens assembly is f, and the following condition is satisfied: f3/f=0.88.

In the first embodiment of the optical lens assembly, a radius of curvature of the object-side surface 141 of the fourth lens 140 is R7, a radius of curvature of the image-side surface 142 of the fourth lens 140 is R8, and the following condition is satisfied: (R7−R8)/(R7+R8)=1.60.

In the first embodiment of the optical lens assembly, the focal length of the first lens 110 is f1, a focal length of the fourth lens 140 is f4, the focal length of the optical lens assembly is f, and the following condition is satisfied: (f1+f4)/f=−1.42.

In the first embodiment of the optical lens assembly, a thickness of the first lens 110 at a maximum effective diameter position of the first lens 110 is ET1, a thickness of the second lens 120 at a maximum effective diameter position of the second lens 120 is ET2, a thickness of the third lens 130 at a maximum effective diameter position of the third lens 130 is ET3, a thickness of the fourth lens 140 at a maximum effective diameter position of the fourth lens 140 is ET4, and the following condition is satisfied: ET1=0.50 mm, ET2=0.87 mm, ET3=1.02 mm, ET4=0.56 mm, ET3/ET4=1.82.

In the first embodiment of the optical lens assembly, the radius of curvature of the object-side surface 141 of the fourth lens 140 is R7, the radius of curvature of the image-side surface 142 of the fourth lens 140 is R8, a radius of curvature of the object-side surface 131 of the third lens 130 is R5, and the following condition is satisfied: (R7+R8)/R5=−11.66.

In the first embodiment of the optical lens assembly, a total of gaps between every two adjacent lenses of the first element group 1A in the first optical axis 191 is ΣAT, and the following condition is satisfied: ΣAT=1.65 mm.

In the first embodiment of the optical lens assembly, a thickness of the fourth lens 140 along the first optical axis 191 is CT4, a thickness of the third lens 130 along the first optical axis 191 is CT3, and the following condition is satisfied: CT4/CT3=1.36.

In the first embodiment of the optical lens assembly, a radius of curvature of the image-side surface 112 of the first lens 110 is R2, a radius of curvature of the object-side surface 121 of the second lens 120 is R3, and the following condition is satisfied: R2/R3=−2.35.

In the first embodiment of the optical lens assembly, a focal length of the second lens 120 is f2, a radius of curvature of the image-side surface 122 of the second lens 120 is R4, and the following condition is satisfied: f2/R4=−4.36.

In the first embodiment of the optical lens assembly, the number of light reflections in the light guide element 160 is NRP, and the following condition is satisfied: NRP=3.

In the first embodiment of the optical lens assembly, the base angle of the light guide element 160 is ABP, and the following condition is satisfied: ABP=32 degrees.

In the first embodiment of the optical lens assembly, half of the maximum field of view of the optical lens assembly is HFOV, the entrance pupil diameter of the optical lens assembly is EPD, the distance from the object-side surface 111 of the first lens 110 to the image-side surface 142 of the fourth lens 140 along the first optical axis 191 is CTL, and the following condition is satisfied:

$$HFOV * EPD / CTL = 19.53 \text{ degrees}.$$

In the first embodiment of the optical lens assembly, the focal length of the optical lens assembly is f, the focal length of the fourth lens 140 is f4, and the following condition is satisfied:

$$f/f4 = -1.04.$$

In the first embodiment of the optical lens assembly, the focal length of the second lens 120 is f2, the focal length of the third lens 130 is f3, and the following condition is satisfied: f2/f3=0.79.

In the first embodiment of the optical lens assembly, the focal length of the third lens 130 is f3, the focal length of the fourth lens 140 is f4, and the following condition is satisfied: f3/f4=−0.91.

In the first embodiment of the optical lens assembly, the focal length of the first lens 110 is f1, the focal length of the second lens 120 is f2, the focal length of the third lens 130 is f3, and the following condition is satisfied: f1*f2/f3=5.76 mm.

In the first embodiment of the optical lens assembly, a thickness of the first lens 110 along the optical axis 191 is CT1, a thickness of the second lens 120 along the optical axis 191 is CT2, the thickness of the third lens 130 along the optical axis 191 is CT3, and the following condition is satisfied: (CT1+CT2)/CT3=3.55.

In the first embodiment of the optical lens assembly, an Abbe number of the first lens 110 is vd1, an Abbe number of the second lens 120 is vd2, and the following condition is satisfied: vd1-vd2=12.58.

In the first embodiment of the optical lens assembly, a radius of curvature of the object-side surface 111 of the first lens 110 is R1, the radius of curvature of the image-side surface 112 of the first lens 110 is R2, and the following condition is satisfied: f*(R1/R2)=18.13 mm.

In the first embodiment of the optical lens assembly, the focal length of the first lens 110 is f1, the focal length of the fourth lens 140 is f4, the thickness of the first lens 110 along the optical axis 191 is CT1, the thickness of the fourth lens 140 along the first optical axis 191 is CT4, and the following condition is satisfied: f1*f4/(CT1+CT4)=48.80 mm.

In the first embodiment of the optical lens assembly, the radius of curvature of the object-side surface 141 of the fourth lens 140 is R7, the radius of curvature of the image-side surface 142 of the fourth lens 140 is R8, and the following condition is satisfied: R7/R8=−4.35.

In the first embodiment of the optical lens assembly, the focal length of the third lens 130 is f3, the focal length of the fourth lens 140 is f4, the thickness of the third lens 130 along the optical axis 191 is CT3, the thickness of the fourth lens 140 along the first optical axis 191 is CT4, and the following condition is satisfied: f3*CT3/(f4*CT4)=−0.67.

The detailed optical data of the respective elements in the optical lens assembly of the first embodiment is shown in Table 1, and the aspheric coefficients of the lenses in the first embodiment is shown in Table 2.

TABLE 1

Embodiment 1
f = −16.00 mm, Fno = 2.23, FOV = 28.35°

| Surface | | Curvature Radius | Thickness/gap | Material | Refractive Index (nd) | Abbe number (vd) | Focal length |
|---|---|---|---|---|---|---|---|
| 0 | Object | infinity | infinity | | | | |
| 1 | First lens | 12.241 (ASP) | 1.482 | glass | 1.814 | 41.0 | 7.26 |
| 2 | | −10.800 (ASP) | 0.127 | | | | |
| 3 | Stop | infinity | 0.070 | | | | |
| 4 | Second lens | 4.594 (ASP) | 0.650 | plastic | 1.591 | 28.4 | −11.20 |
| 5 | | 2.570 (ASP) | 1.447 | | | | |
| 6 | Third lens | −2.962 (ASP) | 0.600 | plastic | 1.667 | 20.4 | −14.12 |
| 7 | | −4.671 (ASP) | 0.008 | | | | |
| 8 | Fourth lens | 44.853 (ASP) | 0.816 | plastic | 1.546 | 56.0 | 15.44 |
| 9 | | −10.311 (ASP) | 0.413 | | | | |
| 10 | Light guide element | infinity | 2.460 | glass | 1.518 | 64.2 | |
| 11 | | infinity | −5.612 | | 1.518 | 64.2 | |
| 12 | | infinity | 5.612 | | 1.518 | 64.2 | |
| 13 | | infinity | −2.460 | | 1.518 | 64.2 | |
| 14 | | infinity | −0.500 | | | | |
| 15 | Optical filter | infinity | −0.210 | glass | 1.518 | 64.2 | |
| 16 | | infinity | −0.087 | | | | |
| 17 | Image plane | infinity | — | | | | |

The reference wavelength is 555 nm.

TABLE 2

Aspheric Coefficients

| Surface | 1 | 2 | 4 | 5 |
|---|---|---|---|---|
| K: | 3.2730E+00 | 0.0000E+00 | −1.6499E+01 | −5.1841E+00 |
| A2: | 0.0000E+00 | 0.0000E+00 | 0.0000E+00 | 0.0000E+00 |
| A4: | 5.8154E−04 | −2.2597E−03 | 8.9620E−03 | 5.7307E−03 |
| A6: | −1.5321E−04 | 1.3237E−03 | −6.8068E−03 | −5.6604E−03 |
| A8: | 5.7096E−05 | −3.3397E−04 | 3.9094E−03 | 3.1461E−03 |
| A10: | −1.3819E−05 | 4.0670E−05 | −1.6926E−03 | −1.4033E−03 |
| A12: | 1.9829E−06 | 5.6647E−07 | 5.1456E−04 | 4.3147E−04 |
| A14: | −1.5424E−07 | −1.1355E−06 | −1.1168E−04 | −9.2586E−05 |
| A16: | 2.2250E−09 | 2.1760E−07 | 1.7493E−05 | 1.4210E−05 |
| A18: | 8.2427E−10 | −2.3440E−08 | −1.9677E−06 | −1.5945E−06 |
| A20: | −9.0997E−11 | 1.6080E−09 | 1.5516E−07 | 1.3133E−07 |
| A22: | 4.6496E−12 | −6.9902E−11 | −8.1392E−09 | −7.6167E−09 |
| A24: | −1.2289E−13 | 1.7652E−12 | 2.5482E−10 | 2.7602E−10 |
| A26: | 1.3511E−15 | −1.9794E−14 | −3.5984E−12 | −4.6217E−12 |

TABLE 2-continued

| Aspheric Coefficients | | | | |
|---|---|---|---|---|
| A28: | 0.0000E+00 | 0.0000E+00 | 0.0000E+00 | 0.0000E+00 |
| A30: | 0.0000E+00 | 0.0000E+00 | 0.0000E+00 | 0.0000E+00 |

| Surface | 6 | 7 | 8 | 9 |
|---|---|---|---|---|
| K: | −7.2618E+00 | −2.2335E+01 | 9.9000E+01 | −6.3830E−01 |
| A2: | 0.0000E+00 | 0.0000E+00 | 0.0000E+00 | 0.0000E+00 |
| A4: | −5.3839E−03 | −1.4535E−02 | −1.5565E−02 | −4.4442E−03 |
| A6: | 3.0085E−03 | 1.4385E−02 | 9.4166E−03 | 5.6051E−04 |
| A8: | −5.1618E−04 | −8.3169E−03 | −5.2033E−03 | 5.6574E−04 |
| A10: | −3.0529E−04 | 3.2826E−03 | 1.7035E−03 | −6.2350E−04 |
| A12: | 2.6878E−04 | −9.0582E−04 | −2.9655E−04 | 3.1085E−04 |
| A14: | −1.0022E−04 | 1.8480E−04 | 1.0065E−05 | −9.5977E−05 |
| A16: | 2.2558E−05 | −2.9624E−05 | 6.5903E−06 | 1.9666E−05 |
| A18: | −3.3140E−06 | 3.8222E−06 | −1.4576E−06 | −2.7186E−06 |
| A20: | 3.2183E−07 | −3.7937E−07 | 1.4508E−07 | 2.5094E−07 |
| A22: | −2.0013E−08 | 2.6206E−08 | −7.4378E−09 | −1.4827E−08 |
| A24: | 7.2396E−10 | −1.0877E−09 | 1.6529E−10 | 5.0710E−10 |
| A26: | −1.1600E−11 | 2.0098E−11 | −4.4159E−13 | −7.6322E−12 |
| A28: | 0.0000E+00 | 0.0000E+00 | 0.0000E+00 | 0.0000E+00 |
| A30: | 0.0000E+00 | 0.0000E+00 | 0.0000E+00 | 0.0000E+00 |

In Table 1, the units of the radius of curvature, the thickness, the gap and the focal length are expressed in mm, and the surface numbers 0-17 respectively represent the surfaces through which the light sequentially pass from the object-side to the image-side, wherein the surface 0 represents a gap between an object and the object-side surface 111 of the first lens 110 along the first optical axis 191; the surface 1 represents the thickness of the first lens 110 along the first optical axis 191; the surface 2 represents a gap between the first lens 110 and the stop 100 along the first optical axis 191; the surface 3 represents a gap between the stop 100 and the second lens 120 along the first optical axis 191; the surface 4 represents the thickness of the second lens 120 along the first optical axis 191; the surface 5 represents a gap between the second lens 120 and the third lens 130 along the first optical axis 191; the surface 6 represents the thickness of the third lens 130 along the first optical axis 191; the surface 7 represents a gap between the third lens 130 and the fourth lens 140 along the first optical axis 191; the surface 8 represents the thickness of the fourth lens 140 along the first optical axis 191; the surface 9 represents a gap between the fourth lens 140 and the light guide element 160 along the first optical axis 191; the surface 10 represents a distance that the chief ray of the optical lens assembly entering along the first optical axis 191 transmits from the first light guide surface 161 to the second light guide surface 162 within the light guide element 160; the surface 11 represents a distance that the chief ray transmits from the second light guide surface 162 to the first light guide surface 161 within the light guide element 160 for the first light reflection, and since the first light reflection is to reflect the chief ray towards the second element group 1B (or the first element group 1A), the distance is expressed in a negative value; the surface 12 represents a distance that the chief ray at the second light reflection transmits from the first light guide surface 161 to the third light guide surface 163 within the light guide element 160; the surface 13 represents a distance that the chief ray at the third light reflection transmits from the third light guide surface 163 to the first light guide surface 161 within the light guide element 160, and since the third light reflection is to reflect the chief ray towards the second element group 1B (or the first element group 1A), the distance is expressed in a negative value; the surface 14 represents a gap between the light guide element 160 and the optical filter 170 along the second optical axis 192; the surface 15 represents the thickness of the optical filter 170 along the second optical axis 192, and since the chief ray transmits toward the second element group 1B, the thickness is expressed as a negative value; the surface 16 represents a gap between the optical filter 170 and the image plane 182 along the second optical axis 192, and since the chief ray transmits toward the second element group 1B, the gap is expressed as a negative value; and the surface 17 is the image plane 182.

In table 2, k represents the conic constant of the curve equation of aspheric surface profiles, and A2, A4, A6, A8, A10, A12, A14, A16, A18, A20, A22, A24, A26, A28, and A30 represent the high-order aspheric coefficients.

The respective tables presented below for respective one of other embodiments are based on the schematic view, the field curvature curve and the distortion curve of this embodiment, and the definitions of parameters in the tables are the same as those in Tables 1-2 of the first embodiment. Therefore, an explanation in this regard will not be provided again.

Second Embodiment

Figure 2A:
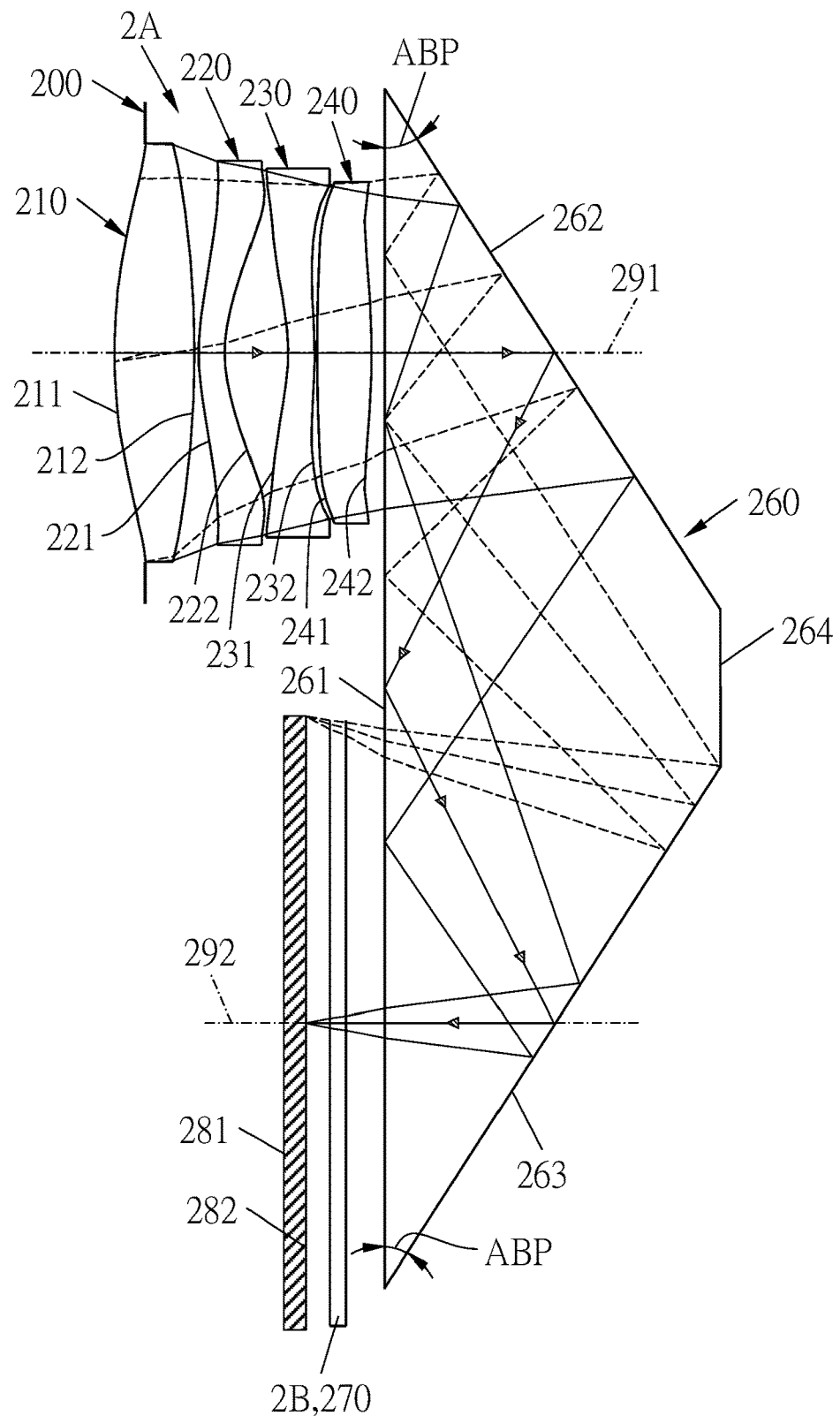
FIG. 2A is a schematic view of an optical lens assembly in accordance with a second embodiment of the present invention.
Figure 2B:
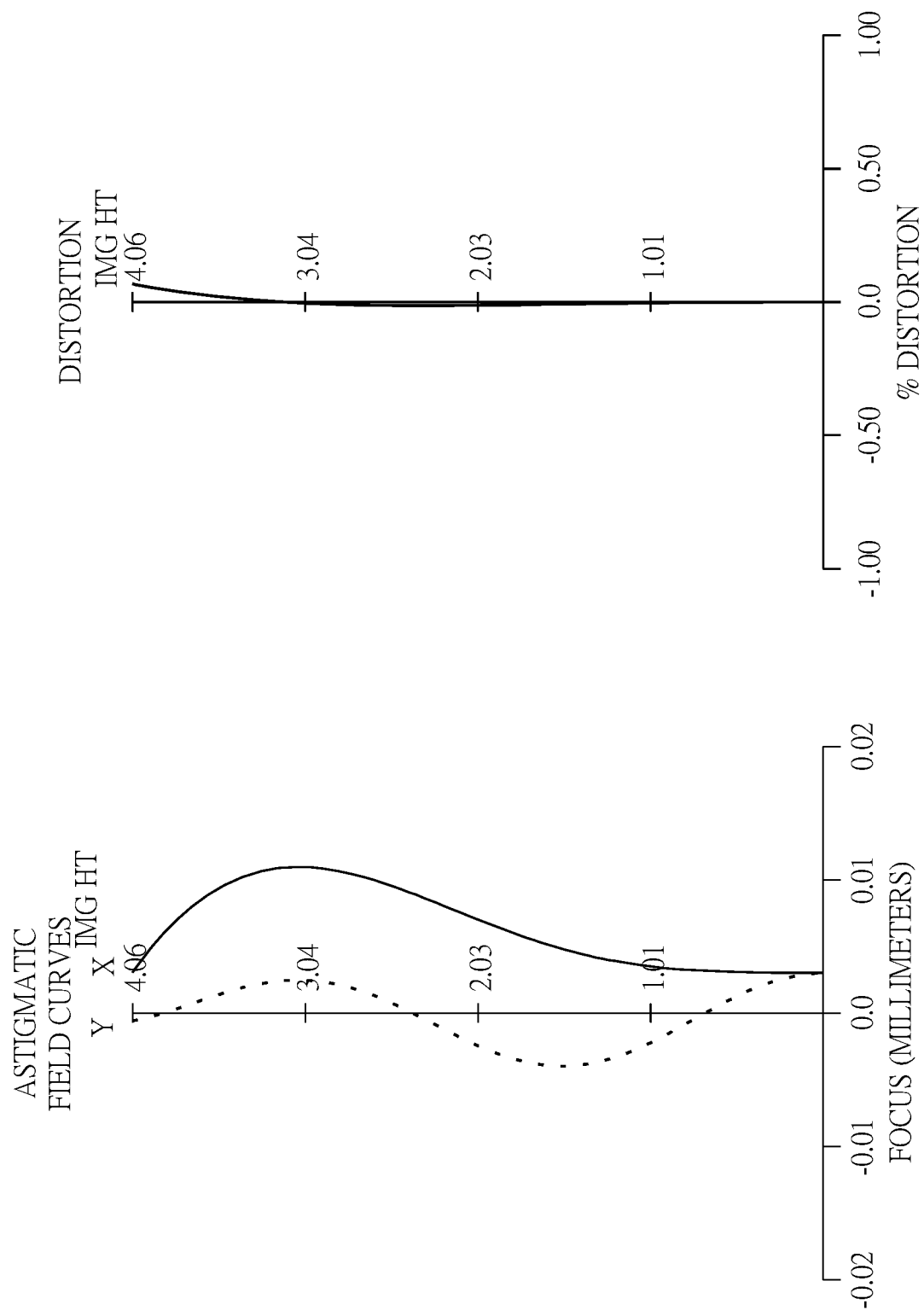
FIG. 2B is a schematic diagram showing, in order from left to right, the field curvature curve and the distortion curve of the second embodiment of the present invention.

Referring to FIGS. 2A and 2B, FIG. 2A shows a schematic view of an optical lens assembly in accordance with a second embodiment of the present invention, and FIG. 2B shows, in order from left to right, the field curvature curve and the distortion curve of the second embodiment of the present invention. As shown in FIG. 2A, optical lens assembly is applicable to be disposed in a first optical axis 291 and a second optical axis 292 parallel to the first optical axis 291, and includes: a first element group 2A located on an object side of the optical lens assembly; a second element group 2B located on an image side of the optical lens assembly; and a light guide element 260 disposed at the position where the first optical axis 291 and the second optical axis 292 pass, the first element group 2A and the second element group 2B being located on the same side of the light guide element 260, and the light guide element 260 is configured to let light rays entering along the first optical axis 291, emit toward the second element group 2B along the second optical axis 292.

The optical lens assembly can cooperate with an image sensor 281 disposed on an image plane 282. The optical lens assembly has a total of four lenses with refractive power, but not limited thereto.

The first element group 2A is disposed along the first optical axis 291 and includes, in order from the object side to the image side: a stop 200, a first lens 210, a second lens 220, a third lens with 230, and a fourth lens 240.

The first lens 210 with positive refractive power includes an object-side surface 211 and an image-side surface 212, the object-side surface 211 of the first lens 210 is convex in a paraxial region thereof in the first optical axis 291, the image-side surface 212 (that is, the surface opposite to the object-side surface 211 and facing the light guide element 260) of the first lens 210 is convex in a paraxial region thereof in the first optical axis 291, the object-side surface 211 and the image-side surface 212 of the first lens 210 are aspheric, and the first lens 210 is made of glass.

The second lens 220 with negative refractive power includes an object-side surface 221 and an image-side surface 222, the object-side surface 221 of the second lens 220 is convex in a paraxial region thereof in the first optical axis 291, the image-side surface 222 (that is, the surface opposite to the object-side surface 221 and facing the light guide element 260) of the second lens 220 is concave in a paraxial region thereof in the first optical axis 291, the object-side surface 221 and the image-side surface 222 of the second lens 220 are aspheric, and the second lens 220 is made of plastic.

The third lens 230 with negative refractive power includes an object-side surface 231 and an image-side surface 232, the object-side surface 231 of the third lens 230 is concave in a paraxial region thereof in the first optical axis 291, the image-side surface 232 (that is, the surface opposite to the object-side surface 231 and facing the light guide element 260) of the third lens 230 is convex in a paraxial region thereof in the first optical axis 291, the object-side surface 231 and the image-side surface 232 of the third lens 230 are aspheric, and the third lens 230 is made of plastic.

The fourth lens 240 with positive refractive power includes an object-side surface 241 and an image-side surface 242, the object-side surface 241 of the fourth lens 240 is convex in a paraxial region thereof in the first optical axis 291, the image-side surface 242 (that is, the surface opposite to the object-side surface 241 and facing the light guide element 260) of the fourth lens 240 is convex in a paraxial region thereof in the first optical axis 291, the object-side surface 241 and the image-side surface 242 of the fourth lens 240 are aspheric, and the fourth lens 240 is made of plastic.

The second element group 2B is disposed along the second optical axis 292 and includes an optical filter 270. The optical filter 270 is made of glass, is located between the light guide element 260 and the image plane 282, and does not interfere with the focal length of the optical lens assembly. In the present embodiment, the optical filter 270 is selected from, for example, but not limited to, optical filters that allow light in the visible light wavebands, in the infrared light wavebands or in both the visible and infrared light wavebands to pass therethrough.

The light guide element 260 is a prism and is trapezoidal in cross section, but not limited thereto. The light guide element 260 includes a first light guide surface 261, a second light guide surface 262, a third light guide surface 263 and a connecting surface 264. The light guide element 260 is disposed at the position where the first optical axis 291 and the second optical axis 292 pass, and is located on the same side of the first element group 2A and the second element group 2B. The first light guide surface 261 is substantially vertical to the first optical axis 291 and the second optical axis 292 and is located on the same side as the second optical axis 292. The second light guide surface 262 is connected to one side of the first light guide surface 261 and is located in the first optical axis 291, and the second light guide surface 262 and the first light guide surface 261 together form a base angle (ABP) of the light guide element 260. The third light guide surface 263 is connected to the opposite side of the first light guide surface 261 and is located in the second optical axis 292, and the third light guide surface 263 and the first light guide surface 261 together form another base angle (ABP) of the light guide element 260. The connecting surface 264 is connected to and located between the second light guide surface 262 and the third light guide surface 263. The light guide element 260 is configured to let light rays entering along the first optical axis 291, emit toward the second element group 2B along the second optical axis 292. As shown in FIG. 2A, the solid line marked by arrows indicates the path of the chief ray in the first element group 2A in the first optical axis 291 and in the second element group 2B in the second optical axis 292. After the chief ray passes through the first element group 2A and enters the light guide element 260 along the first optical axis 291, the chief ray is reflected by the second light guide surface 262 to the first light guide surface 261 for the first light reflection. Then, the chief ray is reflected by the first light guide surface 261 to the third light guide surface 263 for the second light reflection. Finally, the chief ray is reflected by the third light guide surface 263 for the third light reflection, and the chief ray reflected by the third light guide surface 263 emits toward the second element group 2B along the second optical axis 292.

The detailed optical data of the respective elements in the optical lens assembly of the second embodiment is shown in Table 3, and the aspheric coefficients of the lenses in the second embodiment is shown in Table 4.

TABLE 3

Embodiment 2
f = −13.50 mm, Fno = 2.44, FOV = 33.44°

| Surface | | Curvature Radius | Thickness/ gap | Material | Refractive Index (nd) | Abbe number (vd) | Focal length |
|---|---|---|---|---|---|---|---|
| 0 | Object | infinity | infinity | | | | |
| 1 | Stop | infinity | −0.395 | | | | |
| 2 | First lens | 7.305 (ASP) | 1.033 | glass | 1.916 | 35.3 | 5.36 |
| 3 | | −13.828 (ASP) | 0.050 | | | | |
| 4 | Second lens | 3.596 (ASP) | 0.340 | plastic | 1.640 | 24.0 | −10.92 |
| 5 | | 2.287 (ASP) | 0.807 | | | | |
| 6 | Third lens | −2.836 (ASP) | 0.340 | plastic | 1.640 | 24.0 | −8.70 |
| 7 | | −6.050 (ASP) | 0.030 | | | | |
| 8 | Fourth lens | 27.602 (ASP) | 0.700 | plastic | 1.546 | 56.0 | 15.13 |
| 9 | | −11.693 (ASP) | 0.173 | | | | |

TABLE 3-continued

Embodiment 2
f = −13.50 mm, Fno = 2.44, FOV = 33.44°

| Surface | | Curvature Radius | Thickness/gap | Material | Refractive Index (nd) | Abbe number (vd) | Focal length |
|---|---|---|---|---|---|---|---|
| 10 | Light guide element | infinity | 2.163 | glass | 1.571 | 63.0 | |
| 11 | | infinity | −4.933 | | 1.571 | 63.0 | |
| 12 | | infinity | 4.933 | | 1.571 | 63.0 | |
| 13 | | infinity | −2.163 | | 1.571 | 63.0 | |
| 14 | | infinity | −0.500 | | | | |
| 15 | Optical filter | infinity | −0.210 | glass | 1.518 | 64.2 | |
| 16 | | infinity | −0.313 | | | | |
| 17 | Image plane | infinity | — | | | | |

The reference wavelength is 555 nm.

TABLE 4

Aspheric Coefficients

| Surface | 2 | 3 | 4 | 5 |
|---|---|---|---|---|
| K: | −1.0037E+01 | −2.6183E+01 | 0.0000E+00 | −1.0000E+00 |
| A2: | 0.0000E+00 | 0.0000E+00 | 0.0000E+00 | 0.0000E+00 |
| A4: | 3.1133E−03 | 8.2690E−04 | −3.3866E−02 | −3.4243E−02 |
| A6: | −7.1636E−04 | −2.4928E−03 | 1.2733E−03 | 6.1079E−03 |
| A8: | 9.0599E−05 | 1.8462E−03 | −1.2223E−03 | −7.6966E−03 |
| A10: | −1.5631E−05 | −7.2430E−04 | 2.0314E−03 | 6.4871E−03 |
| A12: | 4.3948E−06 | 1.6919E−04 | 3.4688E−05 | −1.4070E−03 |
| A14: | −1.2454E−06 | −2.4811E−05 | −1.0407E−03 | −1.0322E−03 |
| A16: | 1.9617E−07 | 2.2622E−06 | 7.2045E−04 | 9.1090E−04 |
| A18: | −1.5027E−08 | −1.1792E−07 | −2.6806E−04 | −3.6326E−04 |
| A20: | 4.4069E−10 | 2.6889E−09 | 6.5017E−05 | 9.3932E−05 |
| A22: | 0.0000E+00 | 0.0000E+00 | −1.0847E−05 | −1.7171E−05 |
| A24: | 0.0000E+00 | 0.0000E+00 | 1.2461E−06 | 2.2462E−06 |
| A26: | 0.0000E+00 | 0.0000E+00 | −9.4707E−08 | −2.0152E−07 |
| A28: | 0.0000E+00 | 0.0000E+00 | 4.2991E−09 | 1.1068E−08 |
| A30: | 0.0000E+00 | 0.0000E+00 | −8.8340E−11 | −2.7811E−10 |

| Surface | 6 | 7 | 8 | 9 |
|---|---|---|---|---|
| K: | 0.0000E+00 | 0.0000E+00 | 0.0000E+00 | 0.0000E+00 |
| A2: | 0.0000E+00 | 0.0000E+00 | 0.0000E+00 | 0.0000E+00 |
| A4: | 9.1720E−02 | 7.9138E−02 | 5.6622E−03 | −1.0760E−03 |
| A6: | −4.0797E−02 | −5.6528E−02 | −2.6114E−02 | 2.3157E−03 |
| A8: | 1.0004E−02 | 3.5103E−02 | 3.4709E−02 | 3.1410E−03 |
| A10: | 6.3261E−03 | −2.0180E−02 | −3.2836E−02 | −8.4187E−03 |
| A12: | −6.9067E−03 | 2.0310E−02 | 3.1798E−02 | 1.1586E−02 |
| A14: | 2.5604E−03 | −2.1111E−02 | −2.7112E−02 | −1.0389E−02 |
| A16: | −1.0820E−04 | 1.4823E−02 | 1.7049E−02 | 6.4046E−03 |
| A18: | −3.1295E−04 | −6.9013E−03 | −7.5426E−03 | −2.7787E−03 |
| A20: | 1.5475E−04 | 2.1906E−03 | 2.3400E−03 | 8.5635E−04 |
| A22: | −3.9667E−05 | −4.7914E−04 | −5.0709E−04 | −1.8664E−04 |
| A24: | 6.2741E−06 | 7.1314E−05 | 7.5307E−05 | 2.8147E−05 |
| A26: | −6.1670E−07 | −6.9166E−06 | −7.3150E−06 | −2.7961E−06 |
| A28: | 3.4708E−08 | 3.9506E−07 | 4.1923E−07 | 1.6469E−07 |
| A30: | −8.5749E−10 | −1.0100E−08 | −1.0762E−08 | −4.3586E−09 |

In the second embodiment, the curve equation of the aspheric surface profiles of the aforementioned lenses is the same as the curve equation of the first embodiment.

Also, the definitions of these parameters shown in the following table are the same as those stated in the first embodiment, so an explanation in this regard will not be provided again. These parameters can be calculated from Table 3 and Table 4 as the following values, and the following conditions in the following table are satisfied.

| Embodiment 2 | | | |
|---|---|---|---|
| f[mm] | −13.50 | R2/R3 | −3.85 |
| EPD [mm] | 5.53 | f2/R4 | −4.78 |
| Fno | 2.44 | NRP ≥ 3 | 3.00 |
| FOV[°] | 33.44 | ABP[°] | 32.00 |
| \|f/EPD\| | 2.44 | f/f4 | −0.89 |
| f1/f | −0.40 | f2/f3 | 1.26 |
| CTL/IMH | 0.81 | f3/f4 | −0.57 |
| \|ODT\| [%] | 0.07 | f1*f2/f3 [mm] | 6.72 |
| f3/f | 0.64 | (CT1 + CT2)/CT3 | 4.04 |
| (R7 − R8)/(R7 + R8) | 2.47 | vd1 − vd2 | 11.28 |
| (f1 + f4)/f | −1.52 | f*(R1/R2) [mm] | 7.13 |
| ET3/ET4 | 2.05 | f1*f4/(CT1 + CT4) [mm] | 46.66 |
| (R7 + R8)/R5 | −5.61 | R7/R8 | −2.36 |
| ΣAT [mm] | 0.89 | f3*CT3/(f4*CT4) | −0.28 |
| CT4/CT3 | 2.06 | HFOV*EPD/CTL [°] | 28.03 |
| ET1 [mm] | 0.35 | ET3 [mm] | 0.85 |
| ET2 [mm] | 0.56 | ET4 [mm] | 0.42 |

Third Embodiment

Figure 3A:
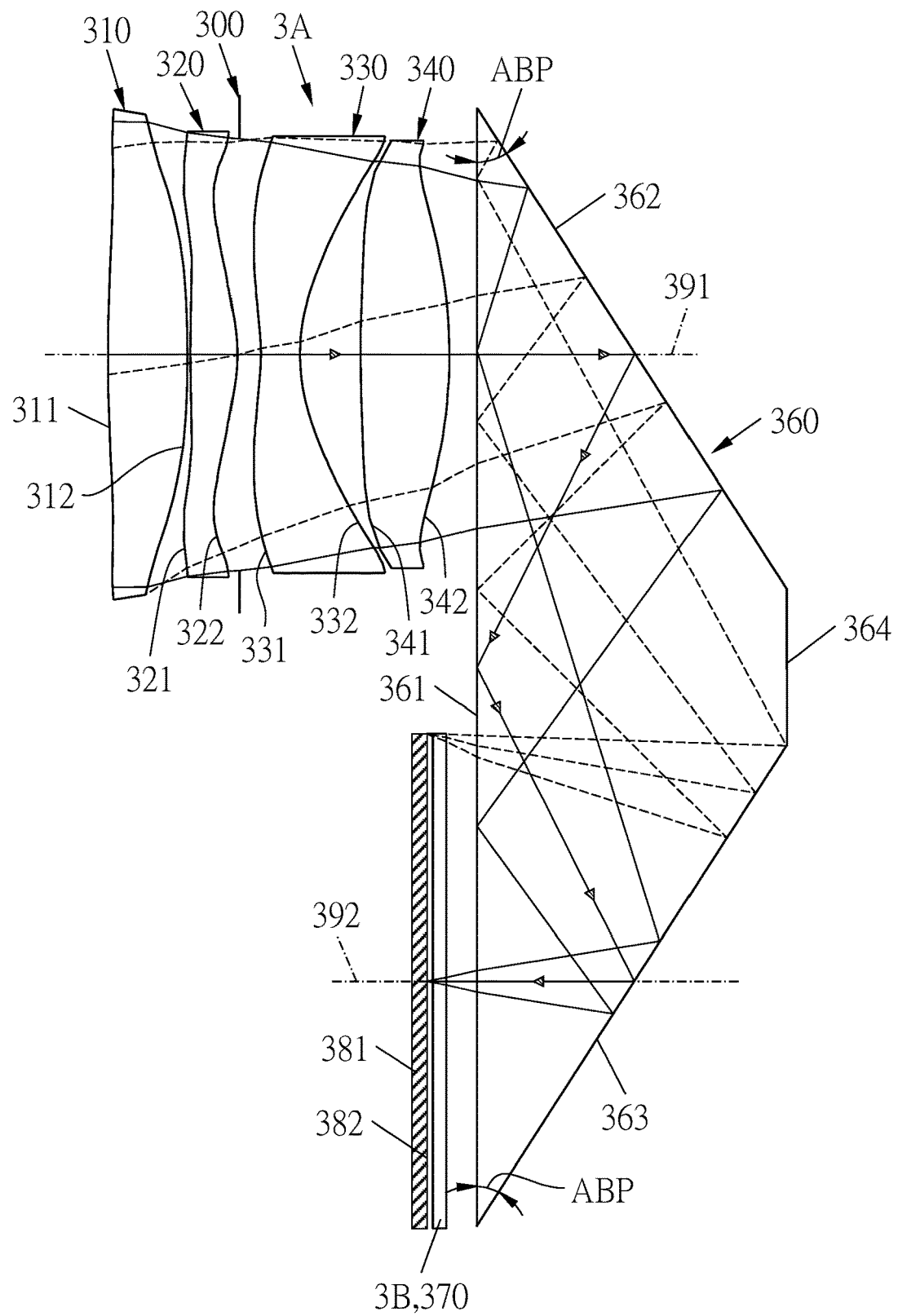
FIG. 3A is a schematic view of an optical lens assembly in accordance with a third embodiment of the present invention.
Figure 3B:
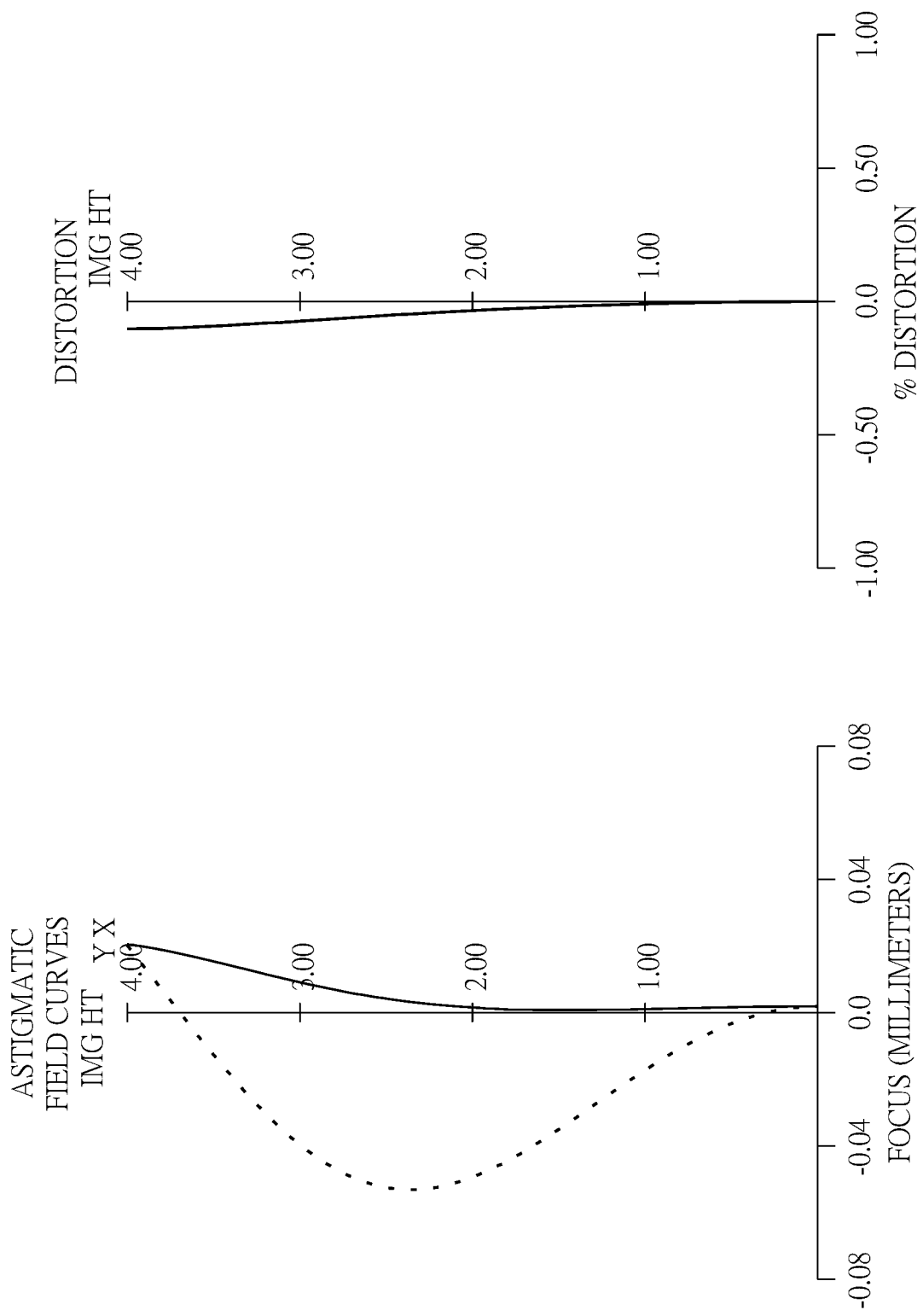
FIG. 3B is a schematic diagram showing, in order from left to right, the field curvature curve and the distortion curve of the third embodiment of the present invention.

Referring to FIGS. 3A and 3B, FIG. 3A shows a schematic view of an optical lens assembly in accordance with a third embodiment of the present invention, and FIG. 3B shows, in order from left to right, the field curvature curve and the distortion curve of the third embodiment of the present invention. As shown in FIG. 3A, optical lens assembly is applicable to be disposed in a first optical axis 391 and a second optical axis 392 parallel to the first optical axis 391, and includes: a first element group 3A located on an object side of the optical lens assembly; a second element group 3B located on an image side of the optical lens assembly; and a light guide element 360 disposed at the position where the first optical axis 391 and the second optical axis 392 pass, the first element group 3A and the second element group 3B being located on the same side of the light guide element 360, and the light guide element 360 is configured to let light rays entering along the first optical axis 391, emit toward the second element group 3B along the second optical axis 392. The optical lens assembly can cooperate with an image sensor 381 disposed on an image plane 382. The optical lens assembly has a total of four lenses with refractive power, but not limited thereto.

The first element group 3A is disposed along the first optical axis 391 and includes, in order from the object side to the image side: a first lens 310, a second lens 320, a stop 300, a third lens with 330, and a fourth lens 340.

The first lens 310 with positive refractive power includes an object-side surface 311 and an image-side surface 312, the object-side surface 311 of the first lens 310 is convex in a paraxial region thereof in the first optical axis 391, the image-side surface 312 (that is, the surface opposite to the object-side surface 311 and facing the light guide element 360) of the first lens 310 is convex in a paraxial region thereof in the first optical axis 391, the object-side surface 311 and the image-side surface 312 of the first lens 310 are aspheric, and the first lens 310 is made of glass.

The second lens 320 with positive refractive power includes an object-side surface 321 and an image-side surface 322, the object-side surface 321 of the second lens 320 is convex in a paraxial region thereof in the first optical axis 391, the image-side surface 322 (that is, the surface opposite to the object-side surface 321 and facing the light guide element 360) of the second lens 320 is convex in a paraxial region thereof in the first optical axis 391, the object-side surface 321 and the image-side surface 322 of the second lens 320 are aspheric, and the second lens 320 is made of plastic.

The third lens 330 with negative refractive power includes an object-side surface 331 and an image-side surface 332, the object-side surface 331 of the third lens 330 is concave in a paraxial region thereof in the first optical axis 391, the image-side surface 332 (that is, the surface opposite to the object-side surface 331 and facing the light guide element 360) of the third lens 330 is concave in a paraxial region thereof in the first optical axis 391, the object-side surface 331 and the image-side surface 332 of the third lens 330 are aspheric, and the third lens 330 is made of plastic.

The fourth lens 340 with positive refractive power includes an object-side surface 341 and an image-side surface 342, the object-side surface 341 of the fourth lens 340 is convex in a paraxial region thereof in the first optical axis 391, the image-side surface 342 (that is, the surface opposite to the object-side surface 341 and facing the light guide element 360) of the fourth lens 340 is convex in a paraxial region thereof in the first optical axis 391, the object-side surface 341 and the image-side surface 342 of the fourth lens 340 are aspheric, and the fourth lens 340 is made of plastic.

The second element group 3B is disposed along the second optical axis 392 and includes an optical filter 370. The optical filter 370 is made of glass, is located between the light guide element 360 and the image plane 382, and does not interfere with the focal length of the optical lens assembly. In the present embodiment, the optical filter 370 is selected from, for example, but not limited to, optical filters that allow light in the visible light wavebands, in the infrared light wavebands or in both the visible and infrared light wavebands to pass therethrough.

The light guide element 360 is a prism and is trapezoidal in cross section, but not limited thereto. The light guide element 360 includes a first light guide surface 361, a second light guide surface 362, a third light guide surface 363 and a connecting surface 364. The light guide element 360 is disposed at the position where the first optical axis 391 and the second optical axis 392 pass, and is located on the same side of the first element group 3A and the second element group 3B. The first light guide surface 361 is substantially vertical to the first optical axis 391 and the second optical axis 392 and is located on the same side as the second optical axis 392. The second light guide surface 362 is connected to one side of the first light guide surface 361 and is located in the first optical axis 391, and the second light guide surface 362 and the first light guide surface 361 together form a base angle (ABP) of the light guide element 360. The third light guide surface 363 is connected to the opposite side of the first light guide surface 361 and is located in the second optical axis 392, and the third light guide surface 363 and the first light guide surface 361 together form another base angle (ABP) of the light guide element 360. The connecting surface 364 is connected to and located between the second light guide surface 362 and the third light guide surface 363. The light guide element 360 is configured to let light rays entering along the first optical axis 391, emit toward the second element group 3B along the second optical axis 392. As shown in FIG. 3A, the solid line marked by arrows indicates the path of the chief ray in the first element group 3A in the first optical axis 391 and in the second element group 3B in the second optical axis 392. After the chief ray passes through the first element group 3A and enters the light guide element 360 along the first optical axis 391, the chief ray is reflected by the second light guide surface 362 to the first light guide surface 361 for the first light reflection. Then, the chief ray is reflected by the first light guide surface 361 to the third light guide surface 363 for the second light reflection. Finally, the chief ray is reflected by the third light guide surface 363 for the third light reflection, and the chief ray reflected by the third light guide surface 363 emits toward the second element group 3B along the second optical axis 392.

The detailed optical data of the respective elements in the optical lens assembly of the third embodiment is shown in Table 5, and the aspheric coefficients of the lenses in the third embodiment is shown in Table 6.

TABLE 5

Embodiment 3
f = −15.42 mm, Fno = 2.05, FOV = 29.12°

| Surface | | Curvature Radius | Thickness/gap | Material | Refractive Index (nd) | Abbe number (vd) | Focal length |
|---|---|---|---|---|---|---|---|
| 0 | Object | infinity | infinity | | | | |
| 1 | First lens | 26.191 (ASP) | 1.245 | glass | 1.909 | 31.3 | 12.11 |
| 2 | | −18.553 (ASP) | 0.050 | | | | |
| 3 | Second lens | 37.744 (ASP) | 0.728 | plastic | 1.592 | 28.4 | 4.65 |
| 4 | | −2.946 (ASP) | 0.036 | | | | |
| 5 | Stop | infinity | 0.334 | | | | |
| 6 | Third lens | −3.444 (ASP) | 0.615 | plastic | 1.640 | 24.0 | −2.69 |
| 7 | | 3.694 (ASP) | 0.950 | | | | |
| 8 | Fourth lens | 25.384 (ASP) | 1.393 | plastic | 1.546 | 56.0 | 11.49 |
| 9 | | −8.173 (ASP) | 0.420 | | | | |
| 10 | Light guide element | infinity | 2.467 | glass | 1.518 | 64.2 | |
| 11 | | infinity | −5.627 | | 1.518 | 64.2 | |
| 12 | | infinity | 5.627 | | 1.518 | 64.2 | |
| 13 | | infinity | −2.467 | | 1.518 | 64.2 | |
| 14 | | infinity | −0.470 | | | | |
| 15 | Optical filter | infinity | −0.210 | glass | 1.518 | 64.2 | |
| 16 | | infinity | −0.100 | | | | |
| 17 | Image plane | infinity | — | | | | |

The reference wavelength is 555 nm.

TABLE 6

Aspheric Coefficients

| Surface | 1 | 2 | 3 | 4 |
|---|---|---|---|---|
| K: | −1.8936E+00 | −3.1263E+01 | 9.6937E+01 | −7.8946E+00 |
| A2: | 0.0000E+00 | 0.0000E+00 | 0.0000E+00 | 0.0000E+00 |
| A4: | −2.0327E−03 | −2.5440E−03 | 1.6871E−03 | 4.4713E−02 |
| A6: | 5.8477E−04 | 1.8756E−03 | 3.8034E−03 | −2.7369E−02 |
| A8: | −7.1335E−05 | −1.0721E−03 | −5.3616E−03 | 8.9134E−03 |
| A10: | −1.6988E−05 | −7.8408E−05 | 2.0467E−03 | −9.6693E−04 |
| A12: | −1.0731E−06 | 2.0094E−04 | −4.6019E−04 | −4.3094E−04 |
| A14: | 3.9828E−06 | −7.3067E−05 | 8.8879E−05 | 2.2615E−04 |
| A16: | −1.3581E−06 | 1.4610E−05 | −1.7238E−05 | −5.2008E−05 |
| A18: | 2.3930E−07 | −1.9057E−06 | 2.8784E−06 | 7.1459E−06 |
| A20: | −2.6148E−08 | 1.7173E−07 | −3.5435E−07 | −6.0952E−07 |
| A22: | 1.8708E−09 | −1.0864E−08 | 3.0293E−08 | 2.9853E−08 |
| A24: | −8.8088E−11 | 4.7660E−10 | −1.7455E−09 | −5.1326E−10 |
| A26: | 2.6362E−12 | −1.3868E−11 | 6.4823E−11 | −2.4695E−11 |
| A28: | −4.5503E−14 | 2.4140E−13 | −1.4050E−12 | 1.4933E−12 |
| A30: | 3.4490E−16 | −1.9062E−15 | 1.3540E−14 | −2.3916E−14 |
| Surface | 6 | 7 | 8 | 9 |
| K: | −2.5570E+01 | −3.8340E−01 | 3.3013E+01 | 1.0948E+00 |
| A2: | 0.0000E+00 | 0.0000E+00 | 0.0000E+00 | 0.0000E+00 |
| A4: | 7.0486E−02 | 4.9137E−02 | −2.0816E−03 | 5.3973E−04 |
| A6: | −7.2313E−02 | −7.3956E−02 | 1.3292E−04 | −2.5372E−04 |
| A8: | 4.7497E−02 | 5.8735E−02 | −2.1090E−03 | −1.9562E−04 |
| A10: | −2.0492E−02 | −3.0636E−02 | 2.8469E−03 | 4.5264E−04 |
| A12: | 6.0815E−03 | 1.1039E−02 | −1.8076E−03 | −3.2134E−04 |
| A14: | −1.2811E−03 | −2.8387E−03 | 6.9586E−04 | 1.3090E−04 |
| A16: | 1.9516E−04 | 5.3242E−04 | −1.7739E−04 | −3.4791E−05 |
| A18: | −2.1663E−05 | −7.3741E−05 | 3.1172E−05 | 6.3616E−06 |

TABLE 6-continued

| Aspheric Coefficients | | | | |
|---|---|---|---|---|
| A20: | 1.7471E−06 | 7.5650E−06 | −3.8370E−06 | −8.1829E−07 |
| A22: | −1.0083E−07 | −5.7013E−07 | 3.3019E−07 | 7.4219E−08 |
| A24: | 4.0325E−09 | 3.0809E−08 | −1.9452E−08 | −4.6648E−09 |
| A26: | −1.0517E−10 | −1.1342E−09 | 7.4713E−10 | 1.9408E−10 |
| A28: | 1.5850E−12 | 2.5538E−11 | −1.6847E−11 | −4.8236E−12 |
| A30: | −1.0186E−14 | −2.6562E−13 | 1.6910E−13 | 5.4377E−14 |

In the third embodiment, the curve equation of the aspheric surface profiles of the aforementioned lenses is the same as the curve equation of the first embodiment.

Also, the definitions of these parameters shown in the following table are the same as those stated in the first embodiment, so an explanation in this regard will not be provided again. These parameters can be calculated from Table 5 and Table 6 as the following values, and the following conditions in the following table are satisfied.

| Embodiment 3 | | | |
|---|---|---|---|
| f[mm] | −15.42 | R2/R3 | −0.49 |
| EPD[mm] | 7.52 | f2/R4 | −1.58 |
| Fno | 2.05 | NRP ≥ 3 | 3.00 |
| FOV[°] | 29.12 | ABP[°] | 32.00 |
| |f/EPD| | 2.05 | f/f4 | −1.34 |
| f1/f | −0.79 | f2/f3 | −1.73 |
| CTL/IMH | 1.34 | f3/f4 | −0.23 |
| |ODT| [%] | 0.10 | f1*f2/f3[mm] | −20.90 |
| f3/f | 0.17 | (CT1 + CT2)/CT3 | 3.21 |
| (R7 − R8)/(R7 + R8) | 1.95 | vd1 − vd2 | 2.89 |
| (f1 + f4)/f | −1.53 | f*(R1/R2)[mm] | 21.76 |
| ET3/ET4 | 3.48 | f1*f4/(CT1 + CT4)[mm] | 52.73 |
| (R7 + R8)/R5 | −5.00 | R7/R8 | −3.11 |
| ΣAT[mm] | 1.37 | f3*CT3/(f4*CT4) | −0.10 |
| CT4/CT3 | 2.27 | HFOV*EPD/CTL[°] | 20.46 |
| ET1[mm] | 0.50 | ET3[mm] | 1.74 |
| ET2[mm] | 0.64 | ET4[mm] | 0.50 |

Fourth Embodiment

Figure 4A:
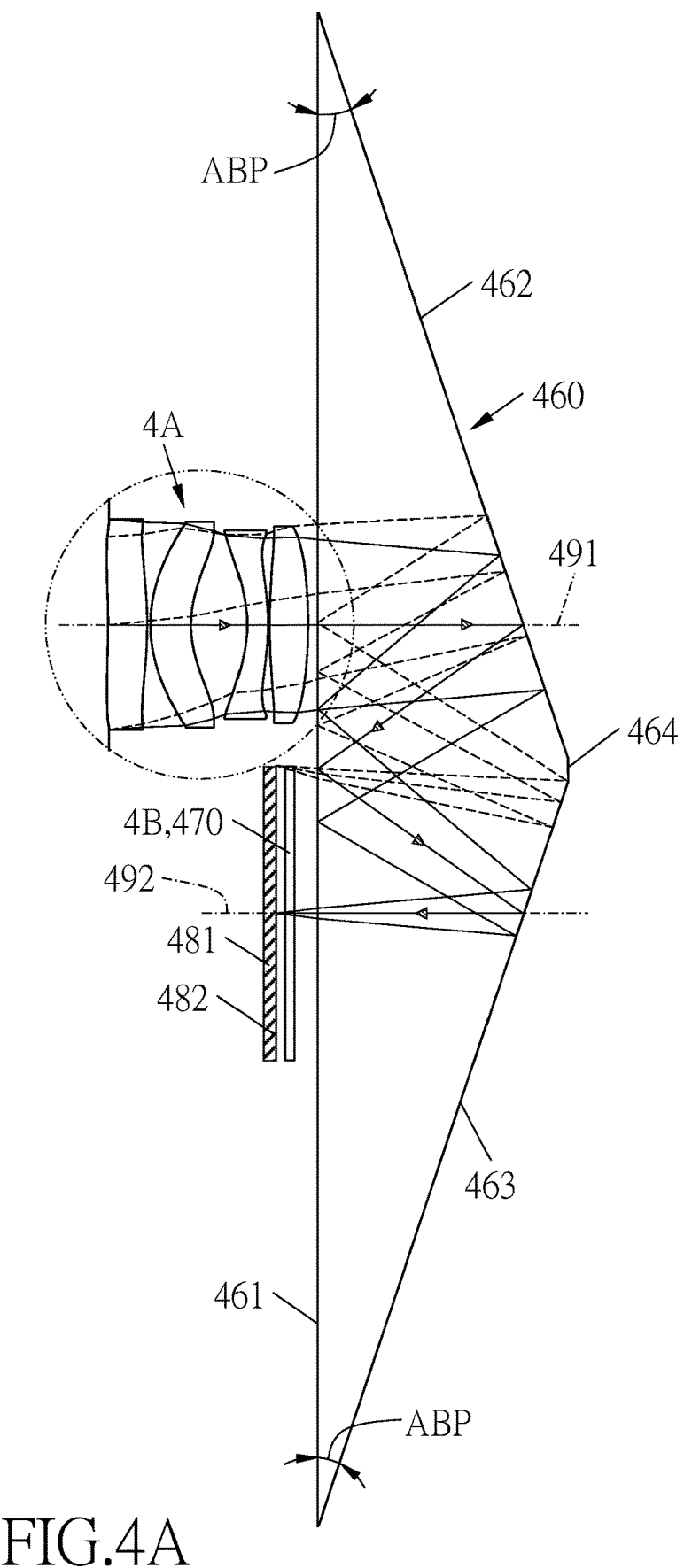
FIG. 4A is a schematic view of an optical lens assembly in accordance with a fourth embodiment of the present invention.
Figure 4B:
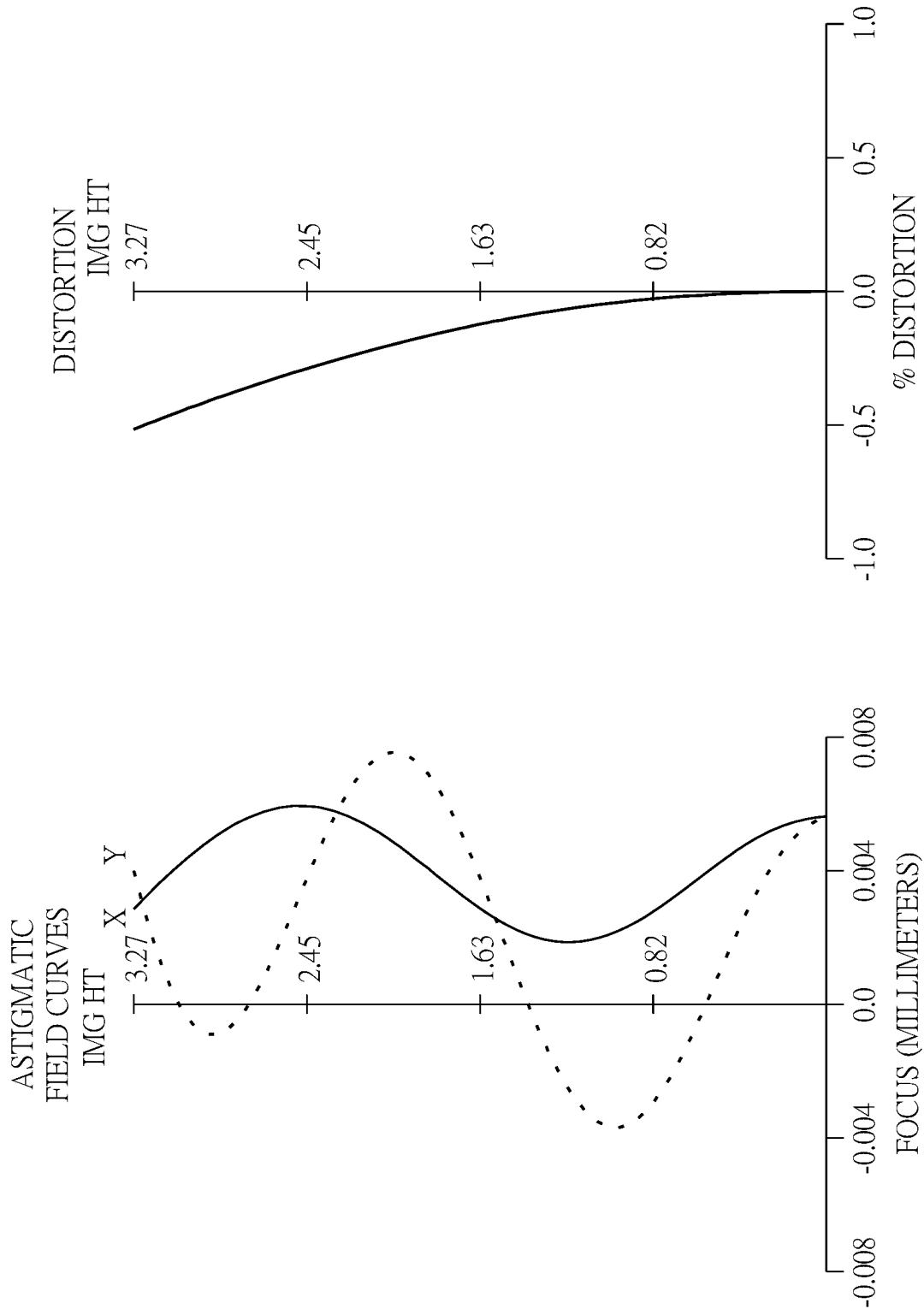
FIG. 4B is a schematic diagram showing, in order from left to right, the field curvature curve and the distortion curve of the fourth embodiment of the present invention.
Figure 4C:
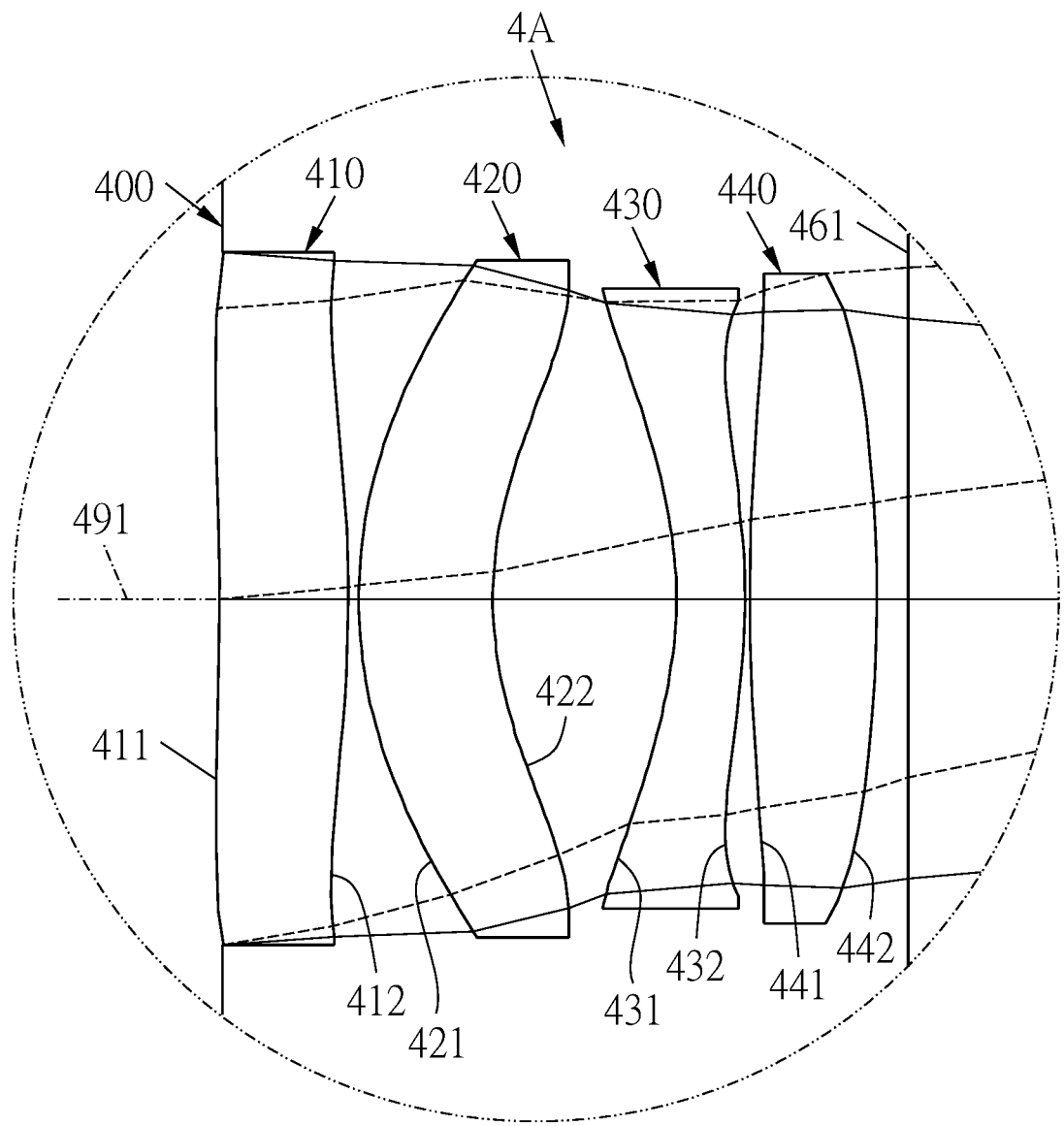
FIG. 4C shows a partial enlarged view of FIG. 4A.

Referring to FIGS. 4A, 4B and 4C, FIG. 4A shows a schematic view of an optical lens assembly in accordance with a fourth embodiment of the present invention, FIG. 4B shows, in order from left to right, the field curvature curve and the distortion curve of the fourth embodiment of the present invention, and FIG. 4C shows a partial enlarged view of FIG. 4A. As shown in FIG. 4A and FIG. 4C, the optical lens assembly is applicable to be disposed in a first optical axis 491 and a second optical axis 492 parallel to the first optical axis 491, and includes: a first element group 4A located on an object side of the optical lens assembly; a second element group 4B located on an image side of the optical lens assembly; and a light guide element 460 disposed at the position where the first optical axis 491 and the second optical axis 492 pass, the first element group 4A and the second element group 4B being located on the same side of the light guide element 460, and the light guide element 460 is configured to let light rays entering along the first optical axis 491, emit toward the second element group 4B along the second optical axis 492. The optical lens assembly can cooperate with an image sensor 481 disposed on an image plane 482. The optical lens assembly has a total of four lenses with refractive power, but not limited thereto.

The first element group 4A is disposed along the first optical axis 491 and includes, in order from the object side to the image side: a stop 400, a first lens 410, a second lens 420, a third lens with 430, and a fourth lens 440.

The first lens 410 with positive refractive power includes an object-side surface 411 and an image-side surface 412, the object-side surface 411 of the first lens 410 is concave in a paraxial region thereof in the first optical axis 491, the image-side surface 412 (that is, the surface opposite to the object-side surface 411 and facing the light guide element 460) of the first lens 410 is convex in a paraxial region thereof in the first optical axis 491, the object-side surface 411 and the image-side surface 412 of the first lens 410 are aspheric, and the first lens 410 is made of glass.

The second lens 420 with negative refractive power includes an object-side surface 421 and an image-side surface 422, the object-side surface 421 of the second lens 420 is convex in a paraxial region thereof in the first optical axis 491, the image-side surface 422 (that is, the surface opposite to the object-side surface 421 and facing the light guide element 460) of the second lens 420 is concave in a paraxial region thereof in the first optical axis 491, the object-side surface 421 and the image-side surface 422 of the second lens 420 are aspheric, and the second lens 420 is made of plastic.

The third lens 430 with negative refractive power includes an object-side surface 431 and an image-side surface 432, the object-side surface 431 of the third lens 430 is concave in a paraxial region thereof in the first optical axis 491, the image-side surface 432 (that is, the surface opposite to the object-side surface 431 and facing the light guide element 460) of the third lens 430 is convex in a paraxial region thereof in the first optical axis 491, the object-side surface 431 and the image-side surface 432 of the third lens 430 are aspheric, and the third lens 430 is made of plastic.

The fourth lens 440 with positive refractive power includes an object-side surface 441 and an image-side surface 442, the object-side surface 441 of the fourth lens 440 is convex in a paraxial region thereof in the first optical axis 491, the image-side surface 442 (that is, the surface opposite to the object-side surface 441 and facing the light guide element 460) of the fourth lens 440 is convex in a paraxial region thereof, the object-side surface 441 and the image-side surface 442 of the fourth lens 440 are aspheric, and the fourth lens 440 is made of plastic.

The second element group 4B is disposed along the second optical axis 492 and includes an optical filter 470. The optical filter 470 is made of glass, is located between the light guide element 460 and the image plane 482, and does not interfere with the focal length of the optical lens assembly. In the present embodiment, the optical filter 470 is selected from, for example, but not limited to, optical filters that allow light in the visible light wavebands, in the infrared light wavebands or in both the visible and infrared light wavebands to pass therethrough.

The light guide element 460 is a prism and is trapezoidal in cross section, but not limited thereto. The light guide element 460 includes a first light guide surface 461, a second light guide surface 462, a third light guide surface 463 and a connecting surface 464. The light guide element 460 is disposed at the position where the first optical axis 491 and the second optical axis 492 pass, and is located on the same side of the first element group 4A and the second element group 4B. The first light guide surface 461 is substantially vertical to the first optical axis 491 and the second optical axis 492 and is located on the same side as the second optical axis 492. The second light guide surface 462 is connected to one side of the first light guide surface 461 and is located in the first optical axis 491, and the second light guide surface 462 and the first light guide surface 461 together form a base angle (ABP) of the light guide element 460. The third light guide surface 463 is connected to the opposite side of the first light guide surface 461 and is located in the second optical axis 492, and the third light guide surface 463 and the first light guide surface 461 together form another base angle (ABP) of the light guide element 460. The connecting surface 464 is connected to and located between the second light guide surface 462 and the third light guide surface 463. The light guide element 460 is configured to let light rays entering along the first optical axis 491, emit toward the second element group 4B along the second optical axis 492. As shown in FIG. 4A, the solid line marked by arrows indicates the path of the chief ray in the first element group 4A in the first optical axis 491 and in the second element group 4B in the second optical axis 492 After the chief ray passes through the first element group 4A and enters the light guide element 460 along the first optical axis 491, the chief ray is reflected by the second light guide surface 462 to the first light guide surface 461 for the first light reflection. Then, the chief ray is reflected by the first light guide surface 461 to the third light guide surface 463 for the second light reflection. Finally, the chief ray is reflected by the third light guide surface 463 for the third light reflection, and the chief ray reflected by the third light guide surface 463 emits toward the second element group 4B along the second optical axis 492.

The detailed optical data of the respective elements in the optical lens assembly of the fourth embodiment is shown in Table 7, and the aspheric coefficients of the lenses in the fourth embodiment is shown in Table 8.

TABLE 7

Embodiment 4
f = −16.81 mm, Fno = 3.60, FOV = 22.11°

| Surface | | Curvature Radius | Thickness/gap | Material | Refractive Index (nd) | Abbe number (vd) | Focal length |
|---|---|---|---|---|---|---|---|
| 0 | Object | infinity | infinity | | | | |
| 1 | Stop | infinity | −0.020 | | | | |
| 2 | First lens | −20.000 (ASP) | 0.845 | glass | 1.916 | 35.3 | 12.44 |
| 3 | | −7.404 (ASP) | 0.065 | | | | |
| 4 | Second lens | 3.283 (ASP) | 0.877 | plastic | 1.678 | 19.2 | −28.45 |
| 5 | | 2.503 (ASP) | 1.202 | | | | |
| 6 | Third lens | −3.010 (ASP) | 0.450 | plastic | 1.678 | 19.2 | −13.26 |
| 7 | | −4.801 (ASP) | 0.030 | | | | |
| 8 | Fourth lens | 17.689 (ASP) | 0.831 | plastic | 1.546 | 56.0 | 12.68 |
| 9 | | −11.190 (ASP) | 0.208 | | | | |
| 10 | Light guide element | infinity | 4.402 | plastic | 1.546 | 56.0 | |
| 11 | | infinity | −5.441 | | 1.546 | 56.0 | |
| 12 | | infinity | 5.441 | | 1.546 | 56.0 | |
| 13 | | infinity | −4.402 | | 1.546 | 56.0 | |
| 14 | | infinity | −0.500 | | | | |
| 15 | Optical filter | infinity | −0.210 | glass | 1.518 | 64.2 | |
| 16 | | infinity | −0.192 | | | | |
| 17 | Image plane | infinity | — | | | | |

The reference wavelength is 555 nm.

TABLE 8

Aspheric Coefficients

| Surface | 2 | 3 | 4 | 5 |
|---|---|---|---|---|
| K: | −2.0000E+01 | −7.4036E+00 | 3.2830E+00 | 2.5028E+00 |
| A2: | −9.9000E+01 | −6.3238E+01 | −5.2804E+00 | −5.8878E+00 |
| A4: | 5.9255E−03 | 2.0461E−03 | 2.1289E−02 | 1.0472E−02 |
| A6: | −1.1705E−03 | −1.2911E−03 | −1.0502E−02 | 3.6006E−03 |
| A8: | 6.1443E−04 | 2.2606E−03 | 5.7033E−03 | −1.7853E−02 |
| A10: | −3.9751E−04 | −1.8419E−03 | −1.0959E−03 | 3.0971E−02 |
| A12: | 1.9318E−04 | 8.8316E−04 | −2.0695E−03 | −3.9218E−02 |
| A14: | −5.5240E−05 | −2.4811E−04 | 2.6228E−03 | 3.6648E−02 |
| A16: | 8.9687E−06 | 4.0323E−05 | −1.6774E−03 | −2.5378E−02 |
| A18: | −7.7168E−07 | −3.5229E−06 | 7.0461E−04 | 1.2926E−02 |
| A20: | 2.7466E−08 | 1.2861E−07 | −2.0576E−04 | −4.7697E−03 |
| A22: | 0.0000E+00 | 0.0000E+00 | 4.1955E−05 | 1.2495E−03 |
| A24: | 0.0000E+00 | 0.0000E+00 | −5.8441E−06 | −2.2542E−04 |

TABLE 8-continued

| Aspheric Coefficients | | | | |
|---|---|---|---|---|
| A26: | 0.0000E+00 | 0.0000E+00 | 5.2922E−07 | 2.6576E−05 |
| A28: | 0.0000E+00 | 0.0000E+00 | −2.8076E−08 | −1.8420E−06 |
| A30: | 0.0000E+00 | 0.0000E+00 | 6.6322E−10 | 5.6931E−08 |

| Surface | 6 | 7 | 8 | 9 |
|---|---|---|---|---|
| K: | −3.0104E+00 | −4.8012E+00 | 1.7689E+01 | −1.1190E+01 |
| A2: | −7.4096E+00 | −5.6037E+00 | 6.6579E+01 | −1.6010E+01 |
| A4: | −1.4644E−02 | 2.5377E−02 | 1.3998E−02 | −2.2979E−03 |
| A6: | 1.9072E−02 | −1.3841E−02 | −2.5505E−02 | −3.6482E−03 |
| A8: | −6.8179E−03 | 3.1844E−02 | 3.9132E−02 | 1.3176E−02 |
| A10: | −4.3752E−02 | −1.1453E−01 | −1.0076E−01 | −2.9884E−02 |
| A12: | 1.1684E−01 | 2.3468E−01 | 1.9482E−01 | 4.1530E−02 |
| A14: | −1.4999E−01 | −2.7751E−01 | −2.2984E−01 | −3.7262E−02 |
| A16: | 1.1808E−01 | 2.0749E−01 | 1.7381E−01 | 2.2515E−02 |
| A18: | −6.1604E−02 | −1.0373E−01 | −8.8557E−02 | −9.4176E−03 |
| A20: | 2.2010E−02 | 3.5666E−02 | 3.1251E−02 | 2.7608E−03 |
| A22: | −5.4295E−03 | −8.4905E−03 | −7.6907E−03 | −5.6564E−04 |
| A24: | 9.1181E−04 | 1.3788E−03 | 1.3007E−03 | 7.9289E−05 |
| A26: | −9.9746E−05 | −1.4606E−04 | −1.4460E−04 | −7.2382E−06 |
| A28: | 6.4205E−06 | 9.1130E−06 | 9.5430E−06 | 3.8703E−07 |
| A30: | −1.8475E−07 | −2.5424E−07 | −2.8401E−07 | −9.1721E−09 |

In the fourth embodiment, the curve equation of the aspheric surface profiles of the aforementioned lenses is the same as the curve equation of the first embodiment.

Also, the definitions of these parameters shown in the following table are the same as those stated in the first embodiment, so an explanation in this regard will not be provided again. These parameters can be calculated from Table 7 and Table 8 as the following values, and the following conditions in the following table are satisfied.

| Embodiment 4 | | | |
|---|---|---|---|
| f[mm] | −16.81 | R2/R3 | −2.26 |
| EPD[mm] | 4.67 | f2/R4 | −11.37 |
| Fno | 3.60 | NRP ≥ 3 | 3.00 |
| FOV[°] | 22.11 | ABP[°] | 18.00 |
| |f/EPD| | 3.60 | f/f4 | −1.33 |
| f1/f | −0.74 | f2/f3 | 2.15 |
| CTL/IMH | 1.32 | f3/f4 | −1.05 |
| |ODT| [%] | 0.52 | f1*f2/f3[mm] | 26.70 |
| f3/f | 0.79 | (CT1 + CT2)/CT3 | 3.83 |
| (R7 − R8)/(R7 + R8) | 4.44 | vd1 − vd2 | 16.10 |
| (f1 + f4)/f | −1.49 | f*(R1/R2)[mm] | −45.41 |
| ET3/ET4 | 2.26 | f1*f4/(CT1 + CT4)[mm] | 94.08 |
| (R7 + R8)/R5 | −2.16 | R7/R8 | −1.58 |
| ΣAT[mm] | 1.30 | f3*CT3/(f4*CT4) | −0.57 |
| CT4/CT3 | 1.85 | HFOV*EPD/CTL[°] | 12.01 |
| ET1[mm] | 0.73 | ET3[mm] | 0.90 |
| ET2[mm] | 0.61 | ET4[mm] | 0.40 |

Fifth Embodiment

Figure 5A:
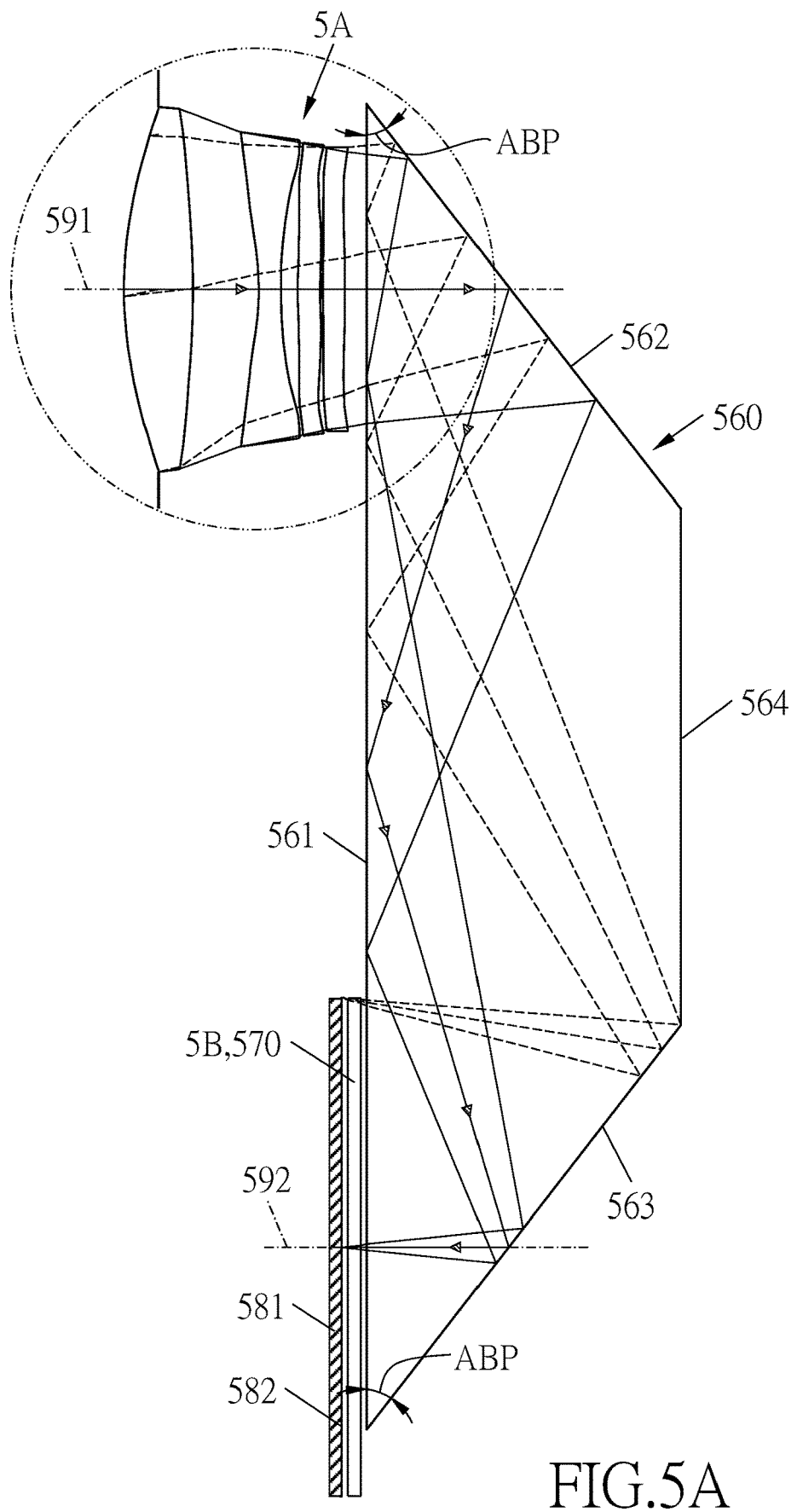
FIG. 5A is a schematic view of an optical lens assembly in accordance with a fifth embodiment of the present invention.
Figure 5B:
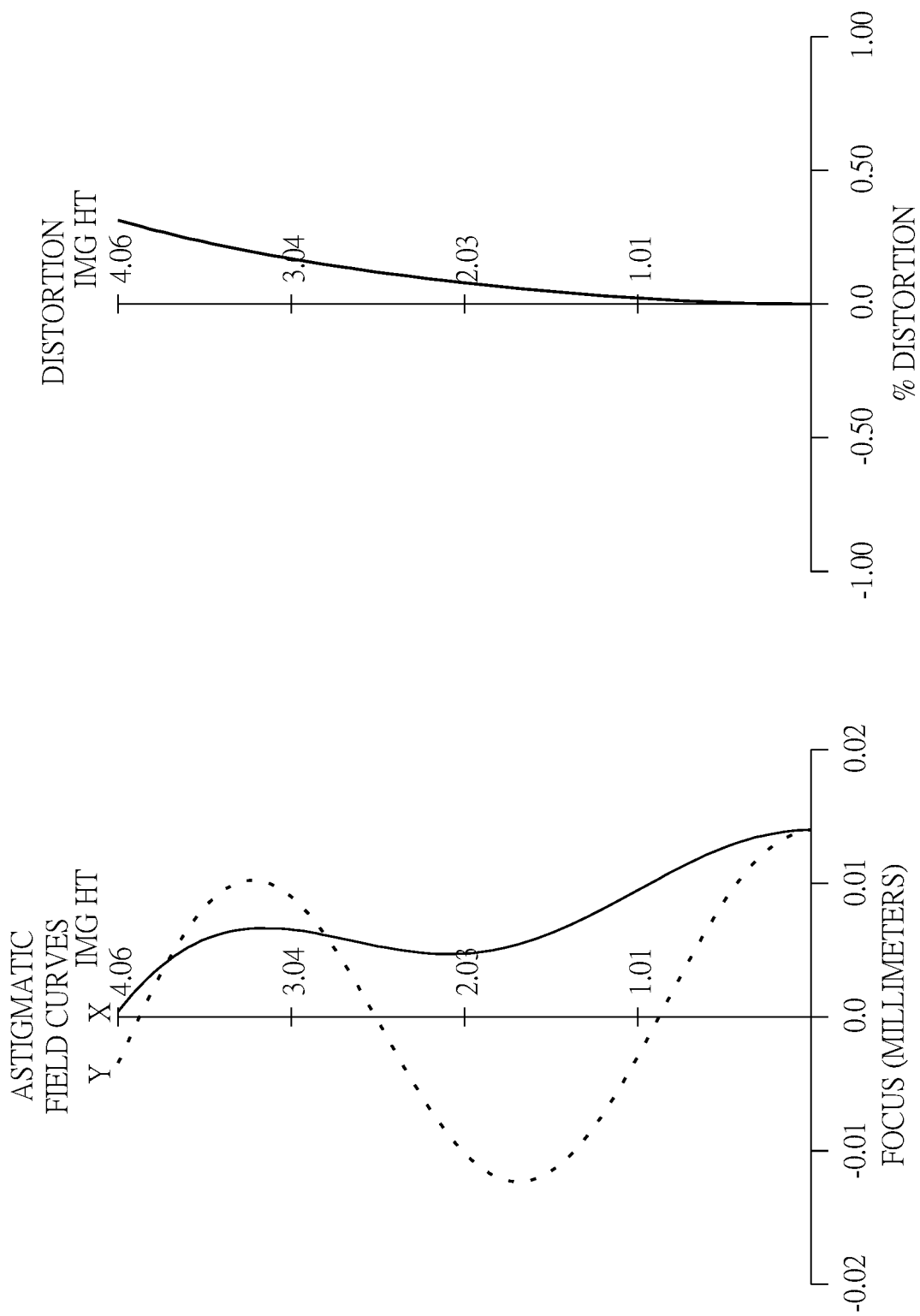
FIG. 5B is a schematic diagram showing, in order from left to right, the field curvature curve and the distortion curve of the fifth embodiment of the present invention.
Figure 5C:
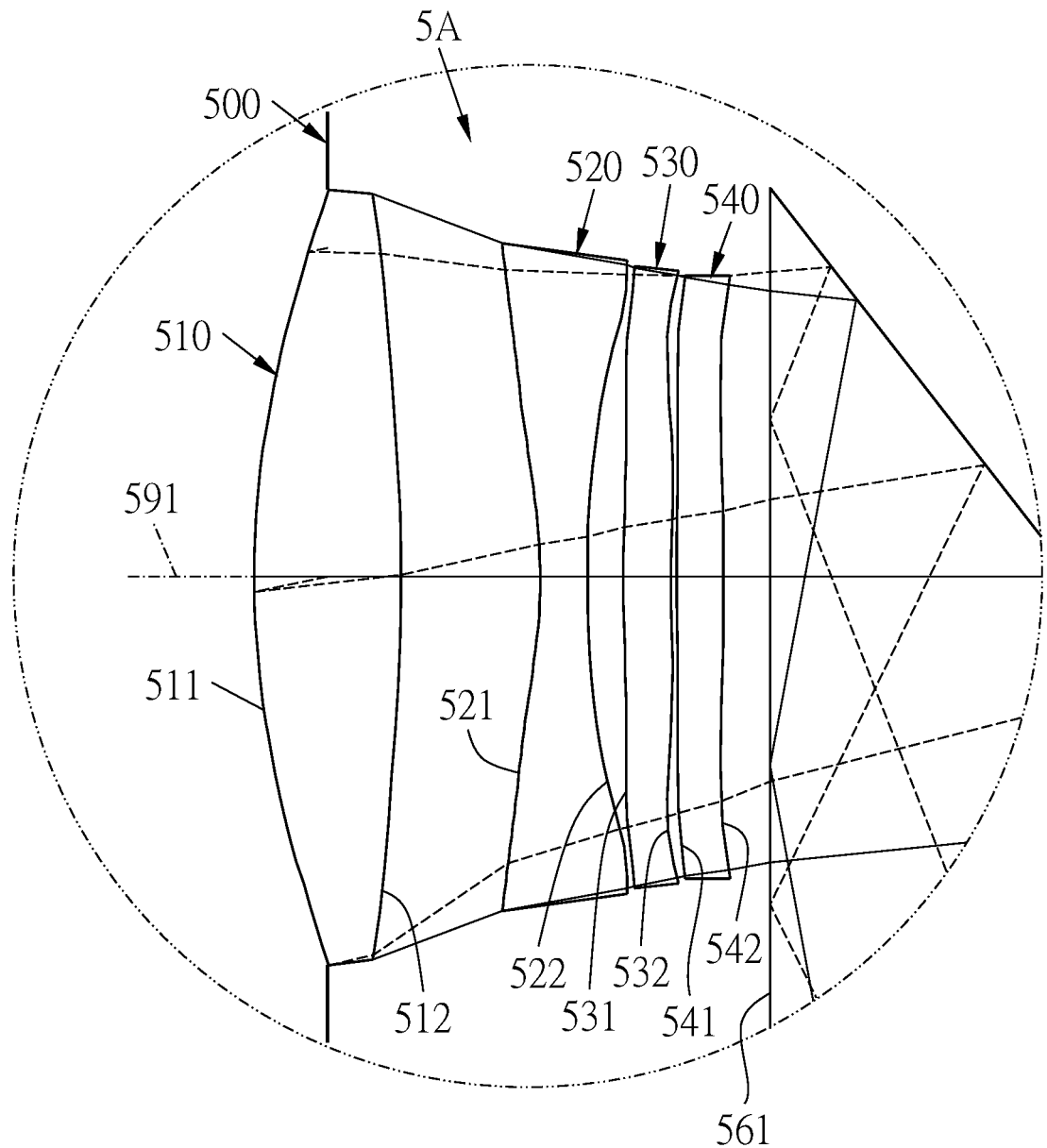
FIG. 5C is a partial enlarged view of FIG. 5A.

Referring to FIGS. 5A, 5B and 5C, FIG. 5A shows a schematic view of an optical lens assembly in accordance with a fifth embodiment of the present invention, FIG. 5B shows, in order from left to right, the field curvature curve and the distortion curve of the fifth embodiment of the present invention, and FIG. 5C shows a partial enlarged view of FIG. 5A. As shown in FIG. 5A and FIG. 5C, the optical lens assembly is applicable to be disposed in a first optical axis 591 and a second optical axis 592 parallel to the first optical axis 591, and includes: a first element group 5A located on an object side of the optical lens assembly; a second element group 5B located on an image side of the optical lens assembly; and a light guide element 560 disposed at the position where the first optical axis 591 and the second optical axis 592 pass, the first element group 5A and the second element group 5B being located on the same side of the light guide element 560, and the light guide element 560 is configured to let light rays entering along the first optical axis 591, emit toward the second element group 5B along the second optical axis 592. The optical lens assembly can cooperate with an image sensor 581 disposed on an image plane 582. The optical lens assembly has a total of four lenses with refractive power, but not limited thereto.

The first element group 5A is disposed along the first optical axis 591 and includes, in order from the object side to the image side: a stop 500, a first lens 510, a second lens 520, a third lens with 530, and a fourth lens 540.

The first lens 510 with positive refractive power includes an object-side surface 511 and an image-side surface 512, the object-side surface 511 of the first lens 510 is convex in a paraxial region thereof in the first optical axis 591, the image-side surface 512 (that is, the surface opposite to the object-side surface 511 and facing the light guide element 560) of the first lens 510 is convex in a paraxial region thereof in the first optical axis 591, the object-side surface 511 and the image-side surface 512 of the first lens 510 are aspheric, and the first lens 510 is made of glass.

The second lens 520 with negative refractive power includes an object-side surface 521 and an image-side surface 522, the object-side surface 521 of the second lens 520 is concave in a paraxial region thereof in the first optical axis 591, the image-side surface 522 (that is, the surface opposite to the object-side surface 521 and facing the light guide element 560) of the second lens 520 is concave in a paraxial region thereof in the first optical axis 591, the object-side surface 521 and the image-side surface 522 of the second lens 520 are aspheric, and the second lens 520 is made of plastic.

The third lens 530 with positive refractive power includes an object-side surface 531 and an image-side surface 532, the object-side surface 531 of the third lens 530 is convex in a paraxial region thereof in the first optical axis 591, the image-side surface 532 (that is, the surface opposite to the object-side surface 531 and facing the light guide element 560) of the third lens 530 is concave in a paraxial region thereof in the first optical axis 591, the object-side surface 531 and the image-side surface 532 of the third lens 530 are aspheric, and the third lens 530 is made of plastic.

The fourth lens 540 with positive refractive power includes an object-side surface 541 and an image-side surface 542, the object-side surface 541 of the fourth lens 540 is convex in a paraxial region thereof in the first optical axis 591, the image-side surface 542 (that is, the surface opposite to the object-side surface 541 and facing the light guide element 560) of the fourth lens 540 is convex in a paraxial region thereof, the object-side surface 541 and the image-side surface 542 of the fourth lens 540 are aspheric, and the fourth lens 540 is made of plastic.

The second element group 5B is disposed along the second optical axis 592 and includes an optical filter 570. The optical filter 570 is made of glass, is located between the light guide element 560 and the image plane 582, and does not interfere with the focal length of the optical lens assembly. In the present embodiment, the optical filter 570 is selected from, for example, but not limited to, optical filters that allow light in the visible light wavebands, in the infrared light wavebands or in both the visible and infrared light wavebands to pass therethrough.

The light guide element 560 is a prism and is trapezoidal in cross section, but not limited thereto. The light guide element 560 includes a first light guide surface 561, a second light guide surface 562, a third light guide surface 563 and a connecting surface 564. The light guide element 560 is disposed at the position where the first optical axis 591 and the second optical axis 592 pass, and is located on the same side of the first element group 5A and the second element group 5B. The first light guide surface 561 is substantially vertical to the first optical axis 591 and the second optical axis 592 and is located on the same side as the second optical axis 592. The second light guide surface 562 is connected to one side of the first light guide surface 561 and is located in the first optical axis 591, and the second light guide surface 562 and the first light guide surface 561 together form a base angle (ABP) of the light guide element 560. The third light guide surface 563 is connected to the opposite side of the first light guide surface 561 and is located in the second optical axis 592, and the third light guide surface 563 and the first light guide surface 561 together form another base angle (ABP) of the light guide element 560. The connecting surface 564 is connected to and located between the second light guide surface 562 and the third light guide surface 563. The light guide element is configured to let light rays entering along the first optical axis 591, emit toward the second element group 5B along the second optical axis 592. As shown in FIG. 5A, the solid line marked by arrows indicates the path of the chief ray in the first element group 5A in the first optical axis 591 and in the second element group 5B in the second optical axis 592. After the chief ray passes through the first element group 5A and enters the light guide element 560 along the first optical axis 591, the chief ray is reflected by the second light guide surface 562 to the first light guide surface 561 for the first light reflection. Then, the chief ray is reflected by the first light guide surface 561 to the third light guide surface 563 for the second light reflection. Finally, the chief ray is reflected by the third light guide surface 563 for the third light reflection, and the chief ray reflected by the third light guide surface 563 emits toward the second element group 5B along the second optical axis 592.

The detailed optical data of the respective elements in the optical lens assembly of the fifth embodiment is shown in Table 9, and the aspheric coefficients of the lenses in the fifth embodiment is shown in Table 10.

TABLE 9

Embodiment 5
f = −19.00 mm, Fno = 3.20, FOV = 24.02°

| Surface | | Curvature Radius | Thickness/ gap | Material | Refractive Index (nd) | Abbe number (vd) | Focal length |
|---|---|---|---|---|---|---|---|
| 0 | Object | infinity | infinity | | | | |
| 1 | Stop | infinity | −0.538 | | | | |
| 2 | First lens | 7.465 (ASP) | 1.084 | glass | 1.814 | 41.0 | 6.32 |
| 3 | | −15.410 (ASP) | 1.033 | | | | |
| 4 | Second lens | −4.004 (ASP) | 0.350 | plastic | 1.640 | 24.0 | −4.43 |
| 5 | | 10.093 (ASP) | 0.263 | | | | |
| 6 | Third lens | 8.280 (ASP) | 0.358 | plastic | 1.648 | 22.5 | 45.18 |
| 7 | | 11.351 (ASP) | 0.040 | | | | |
| 8 | Fourth lens | 18.412 (ASP) | 0.350 | plastic | 1.640 | 24.0 | 15.37 |
| 9 | | −20.973 (ASP) | 0.345 | | | | |
| 10 | Light guide element | infinity | 2.231 | glass | 1.518 | 64.2 | |
| 11 | | infinity | −8.096 | | 1.518 | 64.2 | |
| 12 | | infinity | 8.096 | | 1.518 | 64.2 | |
| 13 | | infinity | −2.231 | | 1.518 | 64.2 | |
| 14 | | infinity | −0.090 | | | | |
| 15 | Optical filter | infinity | −0.210 | glass | 1.518 | 64.2 | |
| 16 | | infinity | −0.100 | | | | |
| 17 | Image plane | infinity | — | | | | |

The reference wavelength is 555 nm.

TABLE 10

| Aspheric Coefficients | | | | |
|---|---|---|---|---|
| Surface | 2 | 3 | 4 | 5 |
| K: | 7.4654E+00 | −1.5410E+01 | −4.0042E+00 | 1.0093E+01 |
| A2: | −2.0857E+00 | −2.6090E+01 | 4.8888E−02 | −5.0904E+00 |
| A4: | 1.0772E−04 | 1.0919E−03 | 3.5649E−02 | −1.7271E−02 |
| A6: | −1.1561E−06 | 1.6814E−04 | 1.4214E−02 | 6.7581E−02 |
| A8: | 3.8841E−05 | −4.3416E−05 | −3.9698E−02 | −9.3576E−02 |
| A10: | −2.2013E−05 | −2.0665E−05 | 4.3995E−02 | 7.7827E−02 |
| A12: | 5.1744E−06 | 9.9679E−06 | −3.2481E−02 | −3.9071E−02 |
| A14: | −6.8174E−07 | −1.8879E−06 | 1.7146E−02 | 8.9868E−03 |
| A16: | 5.0834E−08 | 1.8875E−07 | −6.6180E−03 | 1.9767E−03 |
| A18: | −2.0213E−09 | −9.8536E−09 | 1.8826E−03 | −2.3919E−03 |
| A20: | 3.3541E−11 | 2.1248E−10 | −3.9387E−04 | 9.3771E−04 |
| A22: | 0.0000E+00 | 0.0000E+00 | 5.9808E−05 | −2.1558E−04 |
| A24: | 0.0000E+00 | 0.0000E+00 | −6.4068E−06 | 3.1410E−05 |
| A26: | 0.0000E+00 | 0.0000E+00 | 4.5869E−07 | −2.8538E−06 |
| A28: | 0.0000E+00 | 0.0000E+00 | −1.9685E−08 | 1.4755E−07 |
| A30: | 0.0000E+00 | 0.0000E+00 | 3.8272E−10 | −3.3103E−09 |
| Surface | 6 | 7 | 8 | 9 |
| K: | 8.2795E+00 | 1.1351E+01 | 1.8412E+01 | −2.0973E+01 |
| A2: | −1.2495E+00 | 4.3058E+00 | 1.2100E+01 | 6.1245E+01 |
| A4: | −6.9031E−02 | −2.8039E−02 | 1.4349E−02 | 1.5119E−02 |
| A6: | 7.2366E−02 | −1.1657E−01 | −1.8059E−01 | −3.7480E−02 |
| A8: | −5.8516E−02 | 3.1051E−01 | 3.9908E−01 | 7.9731E−02 |
| A10: | 1.0977E−02 | −4.5404E−01 | −5.4151E−01 | −1.1347E−01 |
| A12: | 3.4986E−02 | 4.5724E−01 | 5.2238E−01 | 1.1628E−01 |
| A14: | −4.5848E−02 | −3.3059E−01 | −3.6931E−01 | −8.6752E−02 |
| A16: | 3.0341E−02 | 1.7344E−01 | 1.9205E−01 | 4.7139E−02 |
| A18: | −1.2822E−02 | −6.6112E−02 | −7.3199E−02 | −1.8623E−02 |
| A20: | 3.6714E−03 | 1.8219E−02 | 2.0284E−02 | 5.3201E−03 |
| A22: | −7.2115E−04 | −3.5815E−03 | −4.0242E−03 | −1.0847E−03 |
| A24: | 9.5706E−05 | 4.8878E−04 | 5.5563E−04 | 1.5364E−04 |
| A26: | −8.1931E−06 | −4.3960E−05 | −5.0640E−05 | −1.4353E−05 |
| A28: | 4.0775E−07 | 2.3420E−06 | 2.7366E−06 | 7.9474E−07 |
| A30: | −8.9440E−09 | −5.5975E−08 | −6.6384E−08 | −1.9749E−08 |

In the fifth embodiment, the curve equation of the aspheric surface profiles of the aforementioned lenses is the same as the curve equation of the first embodiment.

Also, the definitions of these parameters shown in the following table are the same as those stated in the first embodiment, so an explanation in this regard will not be provided again. These parameters can be calculated from Table 9 and Table 10 as the following values, and the following conditions in the following table are satisfied.

| Embodiment 5 | | | |
|---|---|---|---|
| f[mm] | −19.00 | R2/R3 | 3.85 |
| EPD[mm] | 5.94 | f2/R4 | −0.44 |
| Fno | 3.20 | NRP ≥ 3 | 3.00 |
| FOV[°] | 24.02 | ABP[°] | 37.00 |
| |f/EPD| | 3.20 | f/f4 | −1.24 |
| f1/f | −0.33 | f2/f3 | −0.10 |
| CTL/IMH | 0.86 | f3/f4 | 2.94 |
| |ODT| [%] | 0.31 | f1*f2/f3[mm] | −0.62 |
| f3/f | −2.38 | (CT1 + CT2)/CT3 | 4.01 |
| (R7 − R8)/(R7 + R8) | −15.38 | vd1 − vd2 | 17.00 |
| (f1 + f4)/f | −1.14 | f*(R1/R2)[mm] | 9.20 |
| ET3/ET4 | 1.00 | f1*f4/(CT1 + CT4)[mm] | 67.65 |
| (R7 + R8)/R5 | −0.31 | R7/R8 | −0.88 |
| ΣAT[mm] | 1.34 | f3*CT3/(f4*CT4) | 3.00 |
| CT4/CT3 | 0.98 | HFOV*EPD/CTL[°] | 20.50 |
| ET1[mm] | 0.33 | ET3[mm] | 0.32 |
| ET2[mm] | 0.93 | ET4[mm] | 0.32 |

Sixth Embodiment

Figure 6:
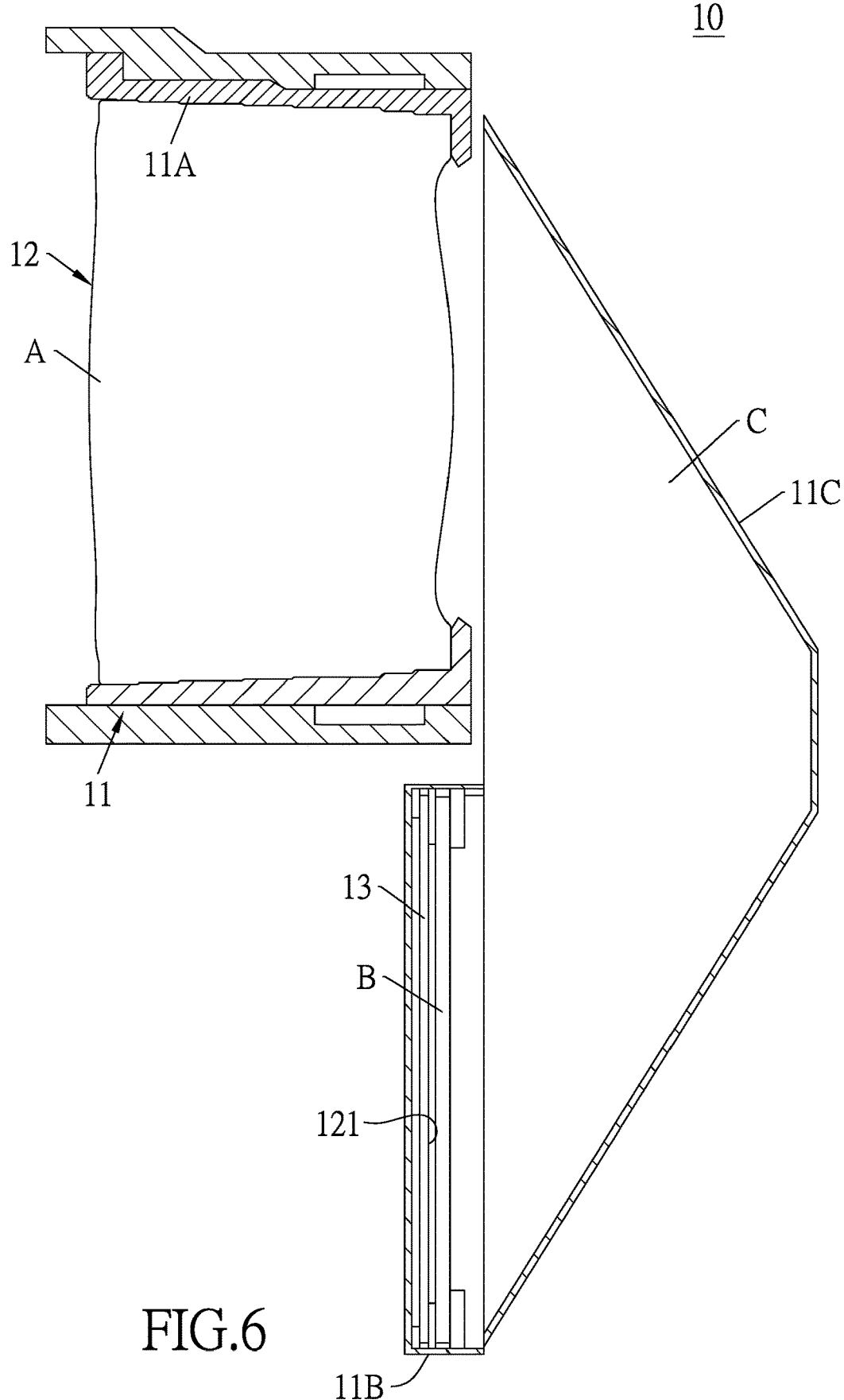
FIG. 6 is a schematic view of a photographing module in accordance with a sixth embodiment of the present invention.

Referring to FIG. 6, which shows a schematic view of a photographing module in accordance with a sixth embodiment of the present invention. The photographing module 10 includes a lens barrel 11, an optical lens assembly 12 and an image sensor 13. In the present embodiment, the lens barrel 11 includes a first lens barrel 11A, a second lens barrel 11B and a third lens barrel 11C. The optical lens assembly 12 is the optical lens assembly of any one of the above embodiments. A first element group A of the optical lens assembly 12 is disposed in the first lens barrel 11A. A second element group B of the optical lens assembly 12 is disposed in the second lens barrel 11B. A light guide element C of the optical lens assembly 12 is disposed in the third lens barrel 11C. The image sensor 13 is disposed on an image plane 121 of the optical lens assembly 12 and is an electronic image sensor (such as, CMOS or CCD) with good photosensitivity and low noise to really present the imaging quality of the optical lens assembly.

For the optical lens assembly in the present invention, the lenses can be made of plastic or glass. If the lens is made of plastic, it is conducive to reducing the manufacturing cost. If the lens is made of glass, it is conducive to enhancing the degree of freedom in the arrangement of refractive power of the optical lens assembly. Moreover, any of the object-side and image-side surfaces of a respective lens of the optical lens assembly can be aspheric, and the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

In the optical lens assembly of the present invention, the optical filter is made of, but not limited to, glass and can be made of other materials with high Abbe numbers.

In the optical lens assembly of the present invention, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens is concave and the location of the concave portion of the respective lens surface of the respective lens is not defined, the concave portion is typically located in a paraxial region of the respective lens surface of the respective lens.

The optical lens assembly of the present invention can be used in focus-adjustable optical systems according to the actual requirements and have good aberration correction ability and better image quality. The optical lens assembly of the present invention can also be used in electronic imaging systems, such as, 3D image capturing device, wearable display of virtual reality (VR) or augmented reality (AR), game player, surveillance camera, digital camera, mobile device, tablet computer or vehicle camera.

What is claimed is:

1. An optical lens assembly with a first optical axis and a second optical axis parallel to the first optical axis, and comprising:
   a first element group located on an object side of the optical lens assembly;
   a second element group located on an image side of the optical lens assembly; and
   a light guide element passed through by the first and second optical axes pass, and the first and second element groups located on the same side of the light guide element;
   wherein the first element group is disposed along the first optical axis and comprises, in order from the object side to the image side: a first lens with positive refractive power, a second lens with refractive power, a third lens with refractive power, and a fourth lens with positive refractive power; the second element group is disposed along the second optical axis and comprises an optical filter; the optical lens assembly allows light to transmit from the first element group along the first optical axis to the second element group along the second optical axis via the light guide element; and a distance from an object-side surface of the first lens to an image-side surface of the fourth lens along the first optical axis is CTL, a maximum image height of the optical lens assembly is IMH, a focal length of the optical lens assembly is f, a focal length of the first lens is f1, and the following conditions are satisfied: $0.65<CTL/IMH<1.61$ and $-0.9<f1/f<0$.

2. The optical lens assembly as claimed in claim 1, wherein the focal length of the optical lens assembly is f, an entrance pupil diameter of the optical lens assembly is EPD, and the following condition is satisfied: $1.74<|f/EPD|<4.14$.

3. The optical lens assembly as claimed in claim 1, wherein an optical distortion of the optical lens assembly is ODT, and the following condition is satisfied: $|ODT|<1\%$.

4. The optical lens assembly as claimed in claim 1, wherein a focal length of the third lens is f3, the focal length of the optical lens assembly is f, and the following condition is satisfied: $-2.85<f3/f<1.06$.

5. The optical lens assembly as claimed in claim 1, wherein a radius of curvature of an object-side surface of the fourth lens is R7, a radius of curvature of the image-side surface of the fourth lens is R8, and the following condition is satisfied: $-18.46<(R7-R8)/(R7+R8)<5.33$.

6. The optical lens assembly as claimed in claim 1, wherein the focal length of the first lens is f1, a focal length of the fourth lens is f4, the focal length of the optical lens assembly is f, and the following condition is satisfied: $-1.84<(f1+f4)/f<-0.91$.

7. The optical lens assembly as claimed in claim 1, wherein a thickness of the third lens at a maximum effective diameter position of the third lens is ET3, a thickness of the fourth lens at a maximum effective diameter position of the fourth lens is ET4, and the following condition is satisfied: $0.8<ET3/ET4<4.18$.

8. The optical lens assembly as claimed in claim 1, wherein a radius of curvature of an object-side surface of the fourth lens is R7, a radius of curvature of the image-side surface of the fourth lens is R8, a radius of curvature of an object-side surface of the third lens is R5, and the following condition is satisfied: $-13.41<(R7+R8)/R5<-0.25$.

9. The optical lens assembly as claimed in claim 1, wherein a total of gaps between every two adjacent lenses of the first element group in the first optical axis is EAT, and the following condition is satisfied: $0.71\ mm<\Sigma AT<1.98\ mm$.

10. The optical lens assembly as claimed in claim 1, wherein a thickness of the fourth lens along the first optical axis is CT4, a thickness of the third lens along the first optical axis is CT3, and the following condition is satisfied: $0.78<CT4/CT3<2.72$.

11. The optical lens assembly as claimed in claim 1, wherein a radius of curvature of an image-side surface of the first lens is R2, a radius of curvature of an object-side surface of the second lens is R3, and the following condition is satisfied: $-4.61<R2/R3<4.62$.

12. The optical lens assembly as claimed in claim 1, wherein a focal length of the second lens is f2, a radius of curvature of an image-side surface of the second lens is R4, and the following condition is satisfied: $-13.07<f2/R4<-0.35$.

13. The optical lens assembly as claimed in claim 1, wherein the number of light reflections in the light guide element is NRP, and the following condition is satisfied: $NRP \geq 3$.

14. The optical lens assembly as claimed in claim 1, wherein a base angle of the light guide element is ABP, and the following condition is satisfied: $15\ degrees<ABP<40\ degrees$.

15. A photographing module, comprising:
   a lens barrel;
   an optical lens assembly disposed in the lens barrel; and
   an image sensor disposed on an image plane of the optical lens assembly;
   wherein the optical lens assembly with a first optical axis and a second optical axis parallel to the first optical axis, comprises: a first element group located on an object side of the optical lens assembly; a second element group located on an image side of the optical lens assembly; and a light guide element passed through by the first and second optical axes, and the first and second element groups located on the same side of the light guide element; the first element group is disposed along the first optical axis and comprises, in order from the object side to the image side: a first lens with positive refractive power, a second lens with refractive power, a third lens with refractive power, and a fourth lens with positive refractive; the second element group is disposed along the second optical axis and comprises an optical filter; the optical lens assembly allows light to transmit from the first element group along the first optical axis to the second element group along the second optical axis via the light guide element; and a distance from an object-side surface of the first lens to an image-side surface of the fourth lens along the first optical axis is CTL, a maximum image height of the optical lens assembly is IMH, a focal length of the optical lens assembly is f, a focal length of the first lens is f1, and the following conditions are satisfied: 0.65<CTL/IMH <1.61 and −0.9<f1/f <0.

16. The photographing module as claimed in claim 15, wherein the focal length of the optical lens assembly is f, an entrance pupil diameter of the optical lens assembly is EPD, and the following condition is satisfied: 1.74<|f/EPD|<4.14.

17. The photographing module as claimed in claim 15, wherein a focal length of the third lens is f3, the focal length of the optical lens assembly is f, and the following condition is satisfied:

$$-2.85 < f3/f < 1.06.$$

18. The photographing module as claimed in claim 15, wherein a radius of curvature of an object-side surface of the fourth lens is R7, a radius of curvature of the image-side surface of the fourth lens is R8, and the following condition is satisfied: −18.46< (R7−R8)/(R7+R8)<5.33.

19. The photographing module as claimed in claim 15, wherein the focal length of the first lens is f1, a focal length of the fourth lens is f4, the focal length of the optical lens assembly is f, and the following condition is satisfied: −1.84<(f1+f4)/f<−0.91.

20. The photographing module as claimed in claim 15, wherein a radius of curvature of an object-side surface of the fourth lens is R7, a radius of curvature of the image-side surface of the fourth lens is R8, a radius of curvature of an object-side surface of the third lens is R5, and the following condition is satisfied: −13.41< (R7+R8)/R5<−0.25.

* * * * *